(12) United States Patent
Guilford

(10) Patent No.: US 10,949,386 B2
(45) Date of Patent: *Mar. 16, 2021

(54) APPARATUS AND METHOD FOR ACCESSING DATA FROM A DATABASE AS A FILE

(71) Applicant: AsterionDB Inc., Irvine, CA (US)

(72) Inventor: Steven Guilford, Los Angeles, CA (US)

(73) Assignee: AsterionDB, Inc., Irvine, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/113,961

(22) Filed: Aug. 27, 2018

(65) Prior Publication Data

US 2019/0012323 A1 Jan. 10, 2019

Related U.S. Application Data

(63) Continuation of application No. 14/809,456, filed on Jul. 27, 2015, now Pat. No. 10,089,315.

(60) Provisional application No. 62/040,947, filed on Aug. 22, 2014.

(51) Int. Cl.
*G06F 16/13* (2019.01)
*G06F 16/188* (2019.01)

(52) U.S. Cl.
CPC ............ *G06F 16/13* (2019.01); *G06F 16/196* (2019.01)

(58) Field of Classification Search
CPC ........ G06F 16/188; G06F 16/182; G06F 8/61; G06F 3/0607; G06F 3/0643; G06F 3/067; G06F 16/178; G06F 16/1858; G06F 16/27; G06F 8/71; G06F 11/1662; G06F 11/202; G06F 11/2056; G06F 11/2089; G06F 11/2094; G06F 16/11; G06F 16/134; G06F 16/16; G06F 16/172; G06F 16/1824; G06F 16/184; G06F 16/192; G06F 16/13; G06F 16/196
USPC ......................................................... 707/752
See application file for complete search history.

(56) References Cited

U.S. PATENT DOCUMENTS

| | | | | |
|---|---|---|---|---|
| 6,336,115 B1 * | 1/2002 | Tominaga | ............... | G06F 16/10 |
| 7,028,079 B2 * | 4/2006 | Mastrianni | ............... | G06F 8/60 |
| | | | | 707/999.202 |
| 7,970,065 B2 * | 6/2011 | Horiguchi | ............... | H04B 7/10 |
| | | | | 370/333 |
| 8,099,605 B1 * | 1/2012 | Billsrom | ............. | G06F 11/1448 |
| | | | | 713/187 |
| 9,311,326 B2 * | 4/2016 | Goyen | .................. | G06F 16/178 |
| 9,367,646 B2 * | 6/2016 | Branton | ............... | G06F 16/904 |

(Continued)

*Primary Examiner* — Sheree N Brown
(74) *Attorney, Agent, or Firm* — Bryan Fibel

(57) ABSTRACT

Apparatus and method are provided for allowing data to be operated upon by external file-based programs that are designed to work on files in a file system. The invention provides for enrolling, by a processor, access to a data object in a database for a client application by retrieving from the database a set of data describing a data object, generating a filename using the retrieved data and a file extension supplied by the client application, correlating the filename with the data object. This is followed by intercepting File I/O requests, specifying the filename, that perform actions on a file, translating the File I/O requests to Data Operations that perform actions on data in a database, performing the Data Operations on the data object, correlated with the filename, in the database.

19 Claims, 26 Drawing Sheets

(56) References Cited

U.S. PATENT DOCUMENTS

| | | | | |
|---|---|---|---|---|
| 9,400,894 B1* | 7/2016 | Telang | .................... | G06F 21/64 |
| 2009/0300604 A1* | 12/2009 | Barringer | ............ | G06F 11/3664 |
| | | | | 717/178 |
| 2014/0122545 A1* | 5/2014 | Cain | ........................ | G06F 16/11 |
| | | | | 707/825 |
| 2014/0222866 A1* | 8/2014 | Joneja | ................... | G06F 16/168 |
| | | | | 707/785 |
| 2014/0310241 A1* | 10/2014 | Goyen | ................. | G06F 16/178 |
| | | | | 707/634 |
| 2019/0042149 A1* | 2/2019 | Kesler | ................... | G06F 3/0659 |

* cited by examiner

300

---

The Enroll-Obscure-File-Operation function is called with the following parameter values:

File Extension, Locator Function, Locator Function Parameter, Value, File Access Mode, User Text, Valid Until, Content Length, Access Limit, New File Operation, On Close Procedure, Enforce Process Security, Enforce Session Security, Enforce IP Security

305

↓

Optionally, execute the Create Obscure File Group process.

310

↓

Generate a random file name.

315

↓

Insert a row into the OBSCURE_OPERATIONS table to store the collected and generated values.

320

↓

Return a character string value that is the result of concatenating the GROUP_KEY, a directory separator, the FILE_KEY, a period ('.') character and the supplied File Extension

```
┌─────────────────────────────────────────────┐
│  The Create A Group Of Files function is    │    405
│  called with one parameter: user-supplied   │
│  text.                                      │
└─────────────────────────────────────────────┘
                      │
                      ▼
┌─────────────────────────────────────────────┐
│  Construct a string of a specific length    │    410
│  which incorporates the user-specified      │
│  text, the process ID (if available), the   │
│  user's IP address and the user's           │
│  database session ID (if available). The    │
│  string may also incorporate a component    │
│  made up of random characters.              │
└─────────────────────────────────────────────┘
                      │
                      ▼
┌─────────────────────────────────────────────┐
│  As an optional step, encrypt the value     │    415
│  of GROUP_KEY                               │
└─────────────────────────────────────────────┘
                      │
                      ▼
┌─────────────────────────────────────────────┐
│  Create a random string value, 54           │    420
│  characters in length. This value will be   │
│  used as the GROUP_FILE_KEY value.          │
└─────────────────────────────────────────────┘
                      │
                      ▼
┌─────────────────────────────────────────────┐
│  Insert a row into the OBSCURE_GROUPS       │    425
│  table where the GROUP_KEY and              │
│  GROUP_FILE_KEY columns are set to the      │
│  values generated by the previous steps.    │
└─────────────────────────────────────────────┘
                      │
                      ▼
┌─────────────────────────────────────────────┐
│  Retrieve the GROUP_ID of the newly         │    430
│  inserted row and return that value to      │
│  the calling program.                       │
└─────────────────────────────────────────────┘
```

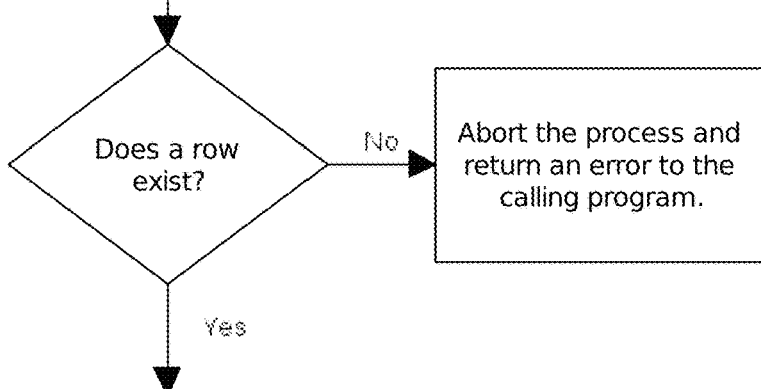

505 — The 'Enroll File In Obscure Group' function is called with the following parameter values:

Group Key, File Extension, Locator Function, Locator Function, Parameter Value, File Access Mode, File Key Suffix, Expiration Date, Content Length, Access Limit, New File Operation, On Close Procedure, Enforce Process Security, Enforce Session Security, Enforce IP Security 510 — Select the row from the OBSCURE_GROUPS table that matches the Group Key parameter.

515 — Does a row exist? No → Abort the process and return an error to the calling program.

520 — Build a FILE_KEY value by concatenating the values of the GROUP_FILE_KEY and the File Key Suffix parameter.

525 — Insert a row into the OBSCURE_OPERATIONS table to store the collected and generated values.

530 — Return a character string value that is the result of concatenating the GROUP_KEY, a directory separator, the FILE_KEY, a period ('.') character and the supplied File Extension

905 — Receive two parameters from the Virtual File System API in response to the 'open file' request. The parameters are the name of the file to open and the requested access mode.

910 — Execute a joined query of the OBSCURE_OPERATIONS and OBSCURE_GROUPS tables to select the row which corresponds to the specified file name and where the VALID_UNTIL value is greater than or equal to the present date and time.

915 — Was a row found? No → Return an appropriate error code to the Virtual File System API.

Yes ↓

920 — Execute the 'Check Security Procedure'. Return an error if the process fails.

925 — Is the ACCESS_LIMIT equal to -1? Yes → Continue with step 935.

| 1105 | Receive four parameters from the file system in response to the read data request. The parameters are:<br>file handle<br>buffer location<br>buffer length<br>file offset |

| 1110 | Find the LOB locator associated with the specified file handle. |

| 1115 | LOB locator found? — No → Return an appropriate error value to the file system. |

Yes

| 1120 | Read the requested amount of data starting at the 'file offset'. The amount of data is specified by the 'buffer length' parameter. Store the data read from the database at the address specified by the 'buffer location' value. Return the number of bytes read as the function's return value. |

```
┌─────────────────────────────────────┐
│ The client program calls the 'Enroll Obscure File  │   1905
│   Access Operation' function with appropriate      │
│ parameter values to enable the enrollment of a file│
│       operation within the obscure gateway.        │
└─────────────────────────────────────┘
                    │
                    ▼
        ┌──────────────────────┐
        │ The user program opens│
        │   the file returned by│         1910
        │ the 'enroll a file' function│
        │  by calling the 'Open A│
        │      File' function.  │
        └──────────────────────┘
                    │
                    ▼
        ┌──────────────────────┐
        │   The user program    │
        │ performs I/O operations│        1915
        │ upon the file by calling│
        │   the 'read from a file'│
        │   and/or 'write to a file'│
        │        functions.     │
        └──────────────────────┘
                    │
                    ▼
        ┌──────────────────────┐
        │   The user program    │         1920
        │  closes the file by   │
        │ calling the 'close a file'│
        │        function.      │
        └──────────────────────┘
```

Figure 19

APPARATUS AND METHOD FOR ACCESSING DATA FROM A DATABASE AS A FILE

CROSS REFERENCE TO RELATED APPLICATIONS

This application is a Continuation that claims priority from a non provisional U.S. patent application Ser. No. 14/809,456 filed on Jul. 27, 2015. Application Ser. No. 14/809,456 is a non provisional that claims priority from a provisional U.S. patent application Ser. No. 62/040,947 filed on Aug. 24, 2014.

FIELD OF THE INVENTION

Embodiments of the invention generally relate to databases and file systems. Specifically, embodiments of the invention relate to exposing data from a database as a file so that it can be manipulated by file-based programs.

BACKGROUND OF THE INVENTION

A database is a collection of data stored in a digital form. Databases have become an integral part of virtually all business and personal applications. A database can store different types of data ranging from personal identification information to various forms of multimedia. Many databases can store data in the form of a large object ("LOB"). A binary large object ("BLOB") is a type of LOB that can store the raw data commonly found in a file (e.g. a multimedia file). A character long object ("GLOB") is a type of LOB that can store ASCII data commonly found in a text file.

The database can store and retrieve the data but lacks the ability to manipulate it. Programs external to the database, such as a word-processing program or a video-editing program, are used to work with the data. However, these programs are designed to work with data that is read from a file in a file system, rather than a database.

These external programs access a file by sending a file I/O request to the operating system ("OS"). The user program may ask the OS to open the file, read a certain number of bytes, and then close the file. The OS verifies that the requested file exists, reads the requested bytes, returns the bytes to the user and then closes the file.

SUMMARY

Data is organized more securely in a database than a file system. Programs, such as a word-processing program or a video-editing program, are designed to work with data that is read from a file in a file system, rather than a database. The present invention allows data to be operated upon by external file-based programs that are designed to work on files in a file system while still being able to organize and store data in a database, rather than a file folder hierarchy.

In accordance with the teachings of the present invention, apparatus and method are provided for accessing data from a database as a file. The invention provides for Enrolling, by a processor, access to a data object in a database for a client application by retrieving from the database a set of data describing a data object, generating a filename using the retrieved data and a file extension supplied by the client application, correlating the filename with the data object. This is followed by intercepting, by a processor, File I/O requests, specifying the filename, that perform actions on a file, translating, by a processor, the File I/O requests to Data Operations that perform actions on data in a database, performing, by a processor, the Data Operations on the data object, correlated with the filename, in the database.

Additionally, use of the file name can be restricted after a specific date. Use of the file name can be restricted after the file has been accessed a specific number of times. Additionally, a group of files can be correlated with data in the database.

The file name can be completely user specified, completely arbitrary or some combination of the two. The filename can include a subdirectory specification that can also be completely user specified, completely arbitrary or some combination of the two. The filename can contain values that include the system process-id and the database session-id to further ensure security.

BRIEF DESCRIPTION OF THE DRAWINGS

The accompanying drawings taken in conjunction with the detailed description will assist in making the advantages and aspects of the disclosure more apparent.

FIG. 3 is a flowchart that describes how an obscure file operation is enrolled.

FIG. 4 is a flowchart that describes how an obscure group is created.

FIG. 5 is a flowchart that describes how an obscure file operation is enrolled in a group.

FIGS. 9a and 9b are a flowchart that describes how an 'open file' request is handled.

FIG. 11 is a flowchart that describes how a 'read file' request is handled.

FIG. 19 is a flowchart that describes how a program might interact with a single file operation in the obscure file gateway.

DETAILED DESCRIPTION

Figure 1:
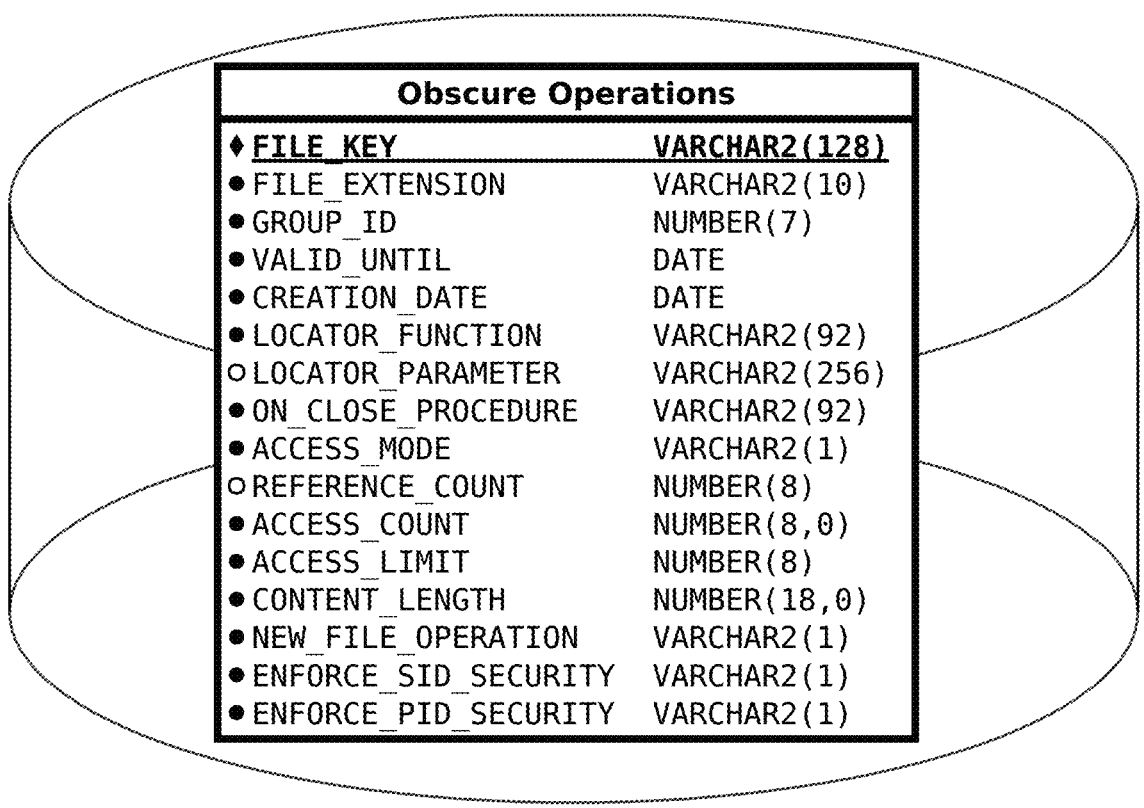
FIG. 1 is a database table layout for the obscure file operations table.

Reference will now be made in detail to the present embodiments discussed herein, illustrated in the accompanying drawings. The embodiments are described below to explain the disclosed apparatus and method by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of program modules that are able to receive data requests and interface with a database. Those skilled in the art will recognize that other implementations may be performed in combination with other types of program modules that may include different data structures, components, or routines that perform similar tasks. The invention can be practiced using various computer system configurations, such as client server systems. Other usable systems can include, but are not limited to, mainframe computers, microprocessors, personal computers, smart phones, tablets, and other consumer electronic devices. Such computer devices may include one or more processors, memory (hard disk, random access memory, cache memory, etc.) an OS able to handle I/O requests, and a database.

Apparatus and method for retrieving data from a database into a file are provided. This application describes exposing LOB data from a database as a file. For the purpose of this application, the use of the encompassing term LOB will include both the BLOB and CLOB datatype unless noted otherwise. Such an invention allows LOB data to be operated upon by external file-based programs that are designed to work on files in a file system while still being able to organize and store data in a database, rather than a file folder hierarchy. Other benefits to this invention include data security and consistency, since most of the information is contained within the database. Additionally, in embodiments where a filename is generated on the fly, consumed, and then dynamically marked as invalid, security is further increased by preventing others from inappropriately using expired filenames. An explanation for exposing LOB data from a database as a file follows.

In automated, logically controlled workspace environments, a console program is often used to access secure resources. This console program contains logic that grants user access to secure resources when and if appropriate to the user. The console program will 'spawn' an external user program (a cooperative program) to work on file-based data in response to user input. These spawned user programs accept command line arguments to indicate the location of any input or output files. The user program can only operate upon the LOB data in the database by accessing it as it normally would, as a file. In order to do so, the console program will become a client of a 'file gateway' (file interface). The console program will 'enroll an entry' (create an entry) in the gateway that allows the external user program to access the LOB data. The entry in the file gateway correlates a filename with LOB data in the database.

Alternatively, a user program can be modified to be minimally 'database aware' allowing the user program to access secure data resources. The user program can only operate upon the LOB data in the database by accessing it as it normally would, as a file. In order to do so, the user program will become a client of a file gateway. The user program will enroll an entry in the gateway that allows it to access the LOB data. The entry in the file gateway correlates a filename with LOB data in the database.

While not a standard use, additionally, a developer user can directly interface with the file gateway. In such a scenario, the user would act as the interfacing client. The user can directly enroll an entry in the gateway that allows the user to access the LOB data. The entry in the file gateway correlates a filename with LOB data in the database.

To add additional security, a new random character filename can be generated each time a user wants to access the data. The obscure filename is used by the user program. Then, when the file is closed, the name can be marked as expired and that name can no longer be used to access the LOB data. Because the console program normally does not display the command line it uses to spawn the user program, the user cannot find out the filename. In such embodiments, the gateway can be referred to as an 'obscure file gateway.' The filename can be completely user specified, completely arbitrary or some combination of the two.

All filenames can be generated in the same directory without any subdirectory specification. Alternatively, subdirectories can be used to separate files for organizational purposes. This enhances security and the ability to audit the use of the file gateway. The filename can include a subdirectory specification that can be completely user specified, completely arbitrary or some combination of the two. For example, the subdirectory can contain user text specified by the program that is interfacing to the file gateway. Such values include, but are not limited to, the process-id, the database session-id, and the host ip-address. The 'id' values can be used to further ensure security. For example, process-id security can ensure that the specified process-id matches the process-id or parent-process-id of the client that is opening the file. Another example could require that the session-id refers to an active session in the database. In embodiments that generate a filename without a subdirectory specification, the 'id' values can still be encoded on the filename.

In the preferred embodiment, a requesting client may want to gain/grant access to a resource in the database. The client identifies the LOB by specifying a function in the database that can be called with specific parameter values. The database function returns an object containing the LOB data to be used by the client. This action is referred to as 'enrolling a file operation.'

In the preferred embodiment, filenames are randomly generated to provide more security, instead of being created from user supplied text. Therefore the term obscure will appear throughout the description, i.e. 'enrolling an obscure file operation' and 'obscure file gateway.' The same principles presented apply to a 'file gateway' where the user specifies the filename and therefore no limitation is intended. Such embodiments only differ in the generation and handling of the obscure filename, and therefore no limitation is intended.

Additionally, in the preferred embodiment, security checks are set up to confirm that a client user has permission to access a file operation or group of files. This is an additional security feature, and therefore no limitation is intended.

As illustrated in FIG. 1, a database table layout 100 of the obscure file operations table is provided.

In the preferred embodiment, the obscure operations table is used to store information about each individual file operation. This OBSCURE_FILE_OPERATIONS table is comprised of the columns: FILE_KEY, FILE_EXTENSION, GROUP_ID, VALID_UNTIL, CREATION_DATE, LOCATOR_FUNCTION, LOCATOR_PARAMETER, ON_CLOSE_PROCEDURE, ACCESS_MODE, REFERENCE_COUNT, ACCESS_COUNT, ACCESS_LIMIT, CONTENT_LENGTH, NEW_FILE_OPERATION, ENFORCE_SID_SECURITY, ENFORCE_PID_SECURITY, and ENFORCE_IP_SECURITY. FILE_KEY is a unique randomly generated variable length filename used to identify a file operation. FILE_EXTENSION is the file extension associated with the complete filename. GROUP_ID is the group id of the group of files that this file is a part of. VALID_UNTIL is a timestamp that indicates the lifespan of the file operation. Once VALID_UNTIL expires, no further operations are allowed upon the file operation. CREATION_DATE is a timestamp indicating when the obscure file operation was created. LOCATOR_FUNCTION is the name of a database function that when executed will return a LOB locator variable or an object type that contains a LOB locator. The function can be contained within a package. LOCATOR_PARAMETER is the value of a parameter, specific to the file operation, which will be included when calling the locator function. ON CLOSE_PROCEDURE is the name of a database procedure that will be executed when closing a file. ACCESS_MODE indicates whether the file operations allow read only, write only or read-write access to the file. Valid values are 'R', 'W', and 'U' respectively. REFERENCE_COUNT indicates the number of current references (open calls) associated with the file key. ACCESS_COUNT indicates the total number of times that the file key has been opened. ACCESS LIMIT specifies a limit to the number of times a file can be opened. CONTENT_LENGTH is the length of the LOB data. The value is utilized in read and read-write operations. NEW_FILE_OPERATION is a flag value which indicates that the obscure entry correlates to a new file. ENFORCE_SID_SECURITY is a flag value which indicates if database session-id security will be enforced for this obscure file operation. ENFORCE_PID_SECURITY is a flag value which indicates if system process-id security will be enforced for this obscure file operation. ENCORCE_IP_SECURITY is a flag value which indicates if ip-address security will be enforced for this obscure file operation. The default value for NEW_FILE_OPERATION, ENFORCE_SID_SECURITY, ENFORCE_PID_SECURITY, ENFORCE_IP SECURITY is 'N'.

Figure 2:
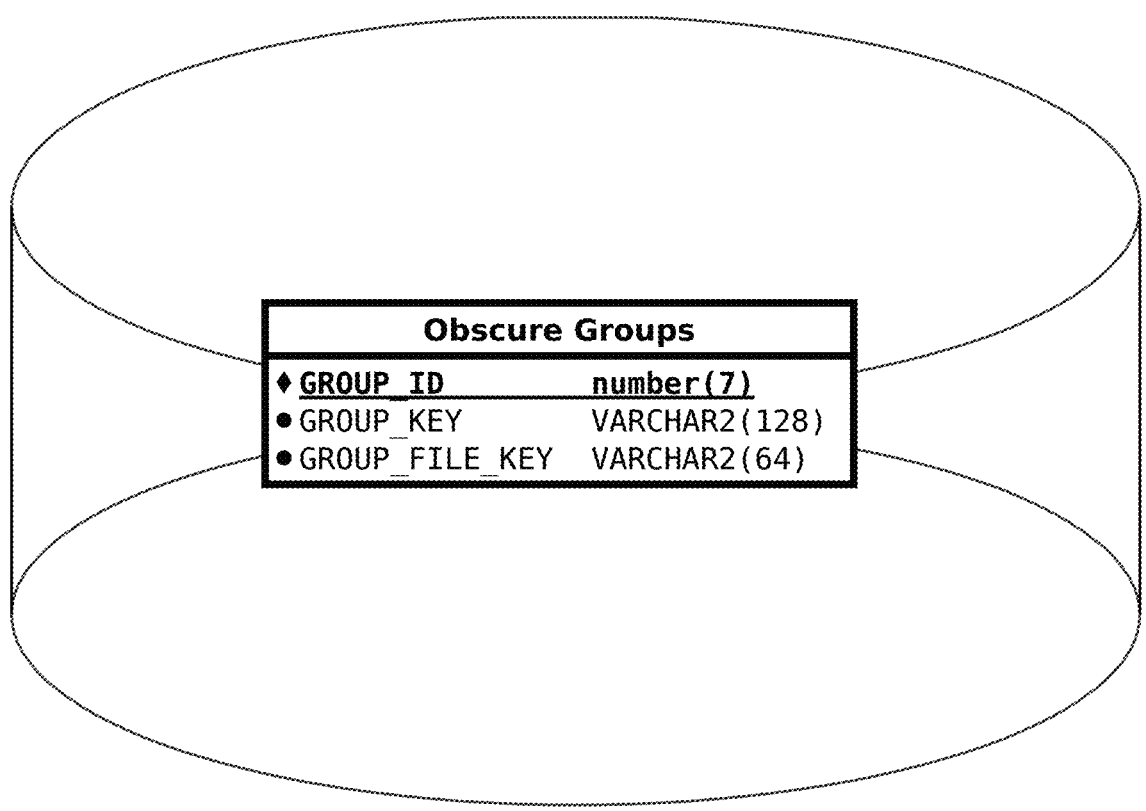
FIG. 2 is a database table layout for the obscure groups table.

As illustrated in FIG. 2, a database table layout 200 of the obscure groups table is provided.

It may be beneficial to organize related files into groups using subdirectories. In such embodiments, the obscure groups table is used to store information about groups of files. This OBSCURE_FILE_OPERATIONS table is comprised of the columns: GROUP_ID, GROUP_KEY, and GROUP_FILE KEY. GROUP_ID is an ID value that uniquely identifies the group and which can be used in relational data references. GROUP_KEY is the subdirectory specification. GROUP_FILE_KEY is the root of all file names that will be generated for files enrolled within the obscure group.

The obscure file gateway API exists as a package and user-defined data types stored in the database. These objects provide functions, constants and data types that are used by client programs that interact with the obscure file gateway. For a simple enrollment of a single file, the client makes a call to a function in the obscure file gateway API. The function will enroll a filename within the gateway and associate the filename with a BLOB in the DB. The obscure file interface will return the filename, or in embodiments which use the obscure groups table, the obscure file interface will return the concatenated value of the group key and the filename.

As illustrated in FIG. 3, a flowchart 300 of the Enroll Obscure File operation, detailing how an obscure file operation is enrolled, is provided.

The parameter values passed to the function are the File Extension, Locator Function, Locator Function Parameter Value, File Access Mode, User Text, Valid Until, Content Length, Access Limit, New File Operation, On Close Procedure, Enforce Process-ID Security, Enforce Session-ID Security, and Enforce IP-address Security 305. File Extension is the file extension to be applied to the generated filename. Locator Function specifies the database function that, when called, will return a LOB object. Locator Function Parameter Value is used when calling the Locator Function. Access Mode indicates the mode of file operation. For example, access mode may indicate the file can be opened for read-only. User Text is user supplied text that will be used, in embodiments that create a subdirectory, when building a subdirectory. Valid Until indicates the file operation expiration date/time. Content Length indicates the LOB's length. Access Limit, an optional value, indicates the number of times to allow a file 'open' operation. The default is to allow one file access operation. Setting the value to −1 allows an unlimited number of file access operations. New File Operation, an optional value, indicates that the obscure file operation corresponds to a file that will be created anew. This allows the obscure entry to be mapped to the associated LOB for use when the file is created. However, it also prevents the 'get attributes' file I/O function from seeing the 'new file operation' entry. On Close Procedure, an optional value, specifies a database procedure that will be called upon closing the obscure file entry. This allows application logic to take specific actions upon the closing of a file. Enforce Process-ID Security, an optional value, indicates whether the client will enforce system process id security upon the program making use of the gateway. Enforce Session-ID Security, an optional value, indicates whether the client will ensure the database session security when satisfying the gateway request. Enforce IP-address Security, an optional value, indicates whether the file system module will enforce client IP address security before satisfying the gateway request.

In embodiments utilizing an obscure groups table, the enrollment process executes the Create Obscure File Group process to create a group for the single file operation 310. The process ID, IP address and DB session ID of the client that is enrolling the obscure file operation can be retrieved by the API from the database. In addition to the User Text parameter value, the process ID, IP address, and DB session ID can be used when building the subdirectory specification to add an additional layer of security, in embodiments that create a subdirectory. A filename of random characters is generated 315. In other embodiments, the filename can be created using user specified input or user specified input combined with random characters. This user text can include system process ID, user's IP address, database username, and user's database session ID if available. A row is inserted in the OBSCURE_FILE_OPERATIONS table to store the collected and generated values 320. The row's column values of FILE_EXTENSION, LOCATOR_FUNCTION, LOCATOR_PARAMETER, ACCESS_MODE, VALI- D_UNTIL, CONTENT_LENGTH, ACCESS_LIMIT, NEW_FILE_OPERATION, ON_CLOSE_PROCEDURE, ENFORCE_PID_SECURITY, ENFORCE_SID_SECURITY, ENFORCE_IP_SECURITY are set respectively with the passed values File Extension, Locator Function, Locator Function Parameter Value, File Access Mode, Valid Until, Content Length, Access Limit, New File Operation, On Close Procedure, Enforce Process-ID Security, Enforce Session-ID Security, and Enforce IP-address Security. The row's column values of FILE_KEY and GROUP_KEY are set respectively with the generated random filename and the group key. The function returns a character string value that is the result of concatenating the GROUP_KEY (if GROUP_KEY exists), a directory separator (if GROUP_KEY exists), the FILE_KEY, a period '.' character and the supplied File Extension 325. The client can then use the generated filename by spawning an associated program and/or by specifying the filename in the course of its processing, such as when it issues file I/O calls.

In some situations, an external user program will open multiple files at a time within the same directory. Examples include a program loading all image files in a directory or a program loading all files related to a project. Files may be distinguished from one another by their filename (file-1.jpg, file-2.jpg and file-3.jpg) or file extension (file.jpg, file.png, and file.pdf. While a subdirectory is optional in instances of a single file operation, the implementation to create a subdirectory for a group of files is extremely useful.

For enrollment of multiple files within a group (subdirectory), a group is created with the obscure file gateway first. The obscure file gateway returns the group key to the client. The application will then specify the group when enrolling the files. The client is then able to operate on each file located within the subdirectory.

As illustrated in FIG. 4, a flowchart 400 of the Create Obscure File Group operation, detailing how an obscure group is created, is provided.

The parameter value passed to the function is the User-Text 405. This user-supplied text is incorporated into the Group Key. The system process ID, IP address and DB session ID of the client that is enrolling the obscure file operation can be retrieved by the API from the database. In addition to the User Text parameter value, the process ID, IP address and DB session ID can be incorporated into the Group Key to add an additional layer of security. A string of a specific length is created incorporating the User Text, system process ID, user's IP address, database username, and user's database session ID if available 410. A portion of the string may also be made up of random characters.

A sample encoding, where each component is separated by two dollar sign '$' characters, is provided:
random text$$client ip address$$client process id$$database session id$$database username$$client supplied text.

An actual example is provided:
'5g67v$$192.168.1.15$$1224$$293969$$MEDIA$$live_project'.

Optionally, the Group Key value can be encrypted to provide more security 415. This value will be used as the Group Key. A random string value 54 characters in length is created which will be used as the Group File Key 420. The Group File Key will be used as the basis for generated filenames within the obscure group. A row is inserted in the OBSCURE_GROUPS table to store the generated values 425. The row's column values of GROUP_KEY, GROUP_FILE_KEY are set respectively with the recently generated values Group Key and Group File Key. The GROUP_ID of the newly inserted row is retrieved and returned to the calling program 430.

As illustrated in FIG. 5, a flowchart 500 of the Enroll File in Obscure Group operation, detailing how an obscure file operation is enrolled in an existing group, is provided.

The parameter values passed to the function are the Group Key, File Extension, Locator Function, Locator Function Parameter Value, File Access Mode, File Key Suffix, Valid Until, Content Length, Access Limit, New File Operation, On Close Procedure, Enforce Process-ID Security, Enforce Session-ID Security, and Enforce IP-address Security 505. Group Key is the value that was saved after creating the group. File Extension is the file extension to be applied to the generated filename. Locator Function specifies the database function that, when called, will return a LOB object. Locator Function Parameter Value is used when calling the Locator Function. Access Mode indicates the mode of file operation. For example, access mode may indicate the file can be opened for read-only. File Key Suffix, an optional value, is a value that will be applied to the generated filename. In the example above (files file-1.jpg, file-2.jpg and file-3.jpg), the suffix values would be −1, −2 and −3. Valid Until indicates the file operation expiration date/time. Content Length, an optional value, indicates the LOB's length. Access Limit, an optional value, indicates the number of times to allow a file 'open' operation. The default is to allow one file access operation. Setting the value to −1 allows an unlimited number of file access operations. New File Operation, an optional value, indicates that the obscure file operation corresponds to a file that will be created anew. This allows the obscure entry to be mapped to the associated LOB for use when the file is created. However, it also prevents the 'get attributes' file I/O function from seeing the 'new file operation' entry. On Close Procedure, an optional value, specifies a database procedure that will be called upon closing the obscure file entry. This allows application logic to take specific actions upon the closing of a file. Enforce Process Security, an optional value, indicates whether the client will enforce system process id security upon the program making use of the gateway. Enforce Session Security, an optional value, indicates whether the client will ensure the database session security when satisfying the gateway request. Enforce IP-address Security, an optional value, indicates whether the file system module will enforce client IP address security before satisfying the gateway request.

The process searches for a row in the OBSCURE_GROUPS table where GROUP_KEY matches the Group Key parameter 510. If a row does not exist, the process returns an appropriate error to the calling program 515. A File Key is built by concatenating the values of the GROUP_FILE_KEY returned from the query and the File Key Suffix parameter 520. A row is inserted in the OBSCURE_FILE_OPERATIONS table to store the collected and generated values 525. The row's column values of GROUP_KEY, FILE_EXTENSION, LOCATOR_FUNCTION, LOCATOR_PARAMETER, ACCESS_MODE, VALID_UNTIL, CONTENT_LENGTH, ACCESS_LIMIT, NEW_FILE_OPERATION, ON_CLOSE_PROCEDURE, ENFORCE_SID_SECURITY, ENFORCE_PID_SECURITY, ENFORCE_IP_SECURITY are set respectively with the passed values Group Key, File Extension, Locator Function, Locator Function Parameter Value, File Access Mode, Valid Until, Content Length, Access Limit, New File Operation, On Close Procedure, Enforce Process-ID Security, Enforce Session-ID Security, and Enforce IP-address Security. The generated random filename is stored in the FILE_KEY column. The function returns a character string value that is the result of concatenating the GROUP_KEY, a directory separator, the FILE_KEY, a period '.' character and the supplied File Extension 530. The client can then use the generated filename and subdirectory path by spawning an associated program and/or by specifying the filename and subdirectory path in the course of its processing, such as when it issues file I/O calls.

Some operating systems provide a mechanism whereby a loadable file-system module, written by a systems programmer skilled in the art, can intercept (or otherwise receive) the file I/O requests of a user program. The file-system module can intercept the file I/O requests of the user program and then perform the actions necessary to satisfy them. This provides an extreme degree of flexibility in the design of a system that satisfies I/O calls. Traditionally, the OS reads and writes data from the specified location on the hard drive. By intercepting OS file read and write requests, the present embodiment of the invention allows one to instead read and write to the database.

For example, Linux has a virtual file-system API which provides a framework that simplifies the writing of a loadable file-system module. It utilizes a dedicated mount point within the Linux file system. When a file I/O request comes in for a file located within the mount point, the OS forwards the file I/O operation on to the user written virtual file-system. The virtual file-system takes whatever actions are necessary to satisfy the I/O request.

In the preferred embodiment, the file I/O operations that have been received and handled accordingly are open file, read file, write file, close file, get file/directory attributes, flush buffered data, open directory, read directory, and close directory. Descriptions of the I/O operations, as performed by the obscure gateway, follow.

Figure 6:
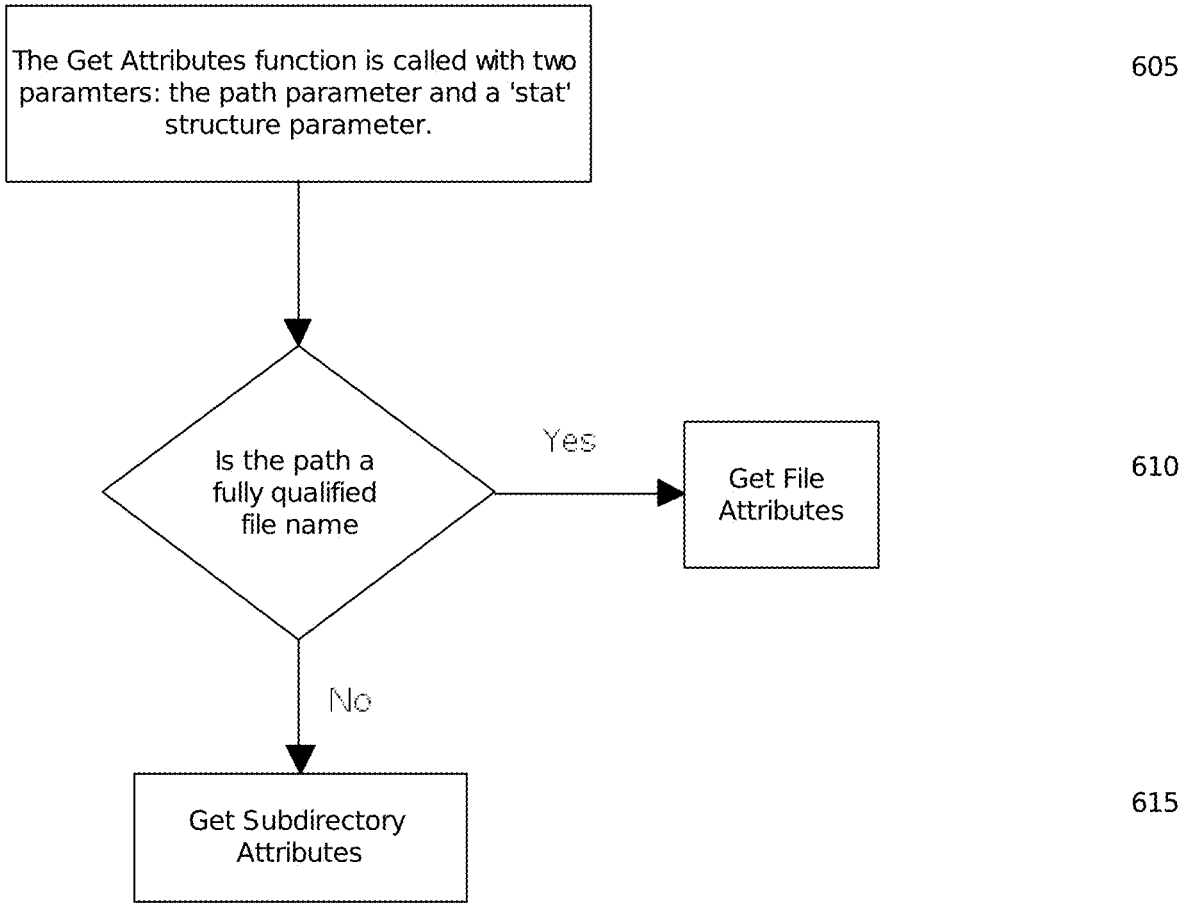
FIG. 6 is a flowchart that describes which 'get attributes' function is called.

As illustrated in FIG. 6, a flowchart 600 of the Get Attributes operation, which determines which Get Attributes function to call in response to a 'get attributes' request, is provided.

The Get Attributes operation can be called for both fully qualified file paths and for subdirectory components of a fully qualified file path. The parameters received from the file system are the file path and a 'stat' structure 605. The 'stat' structure is used to return attribute values to the OS. It is determined whether Get Attributes function is being called for a file path or a subdirectory. This is typically accomplished by counting the number of subdirectory separator characters i.e. '/'. If the path is a fully qualified file name, the Get File Attributes operation is called 610. Otherwise, the Get Subdirectory Attributes operation is called 615.

Figure 7:
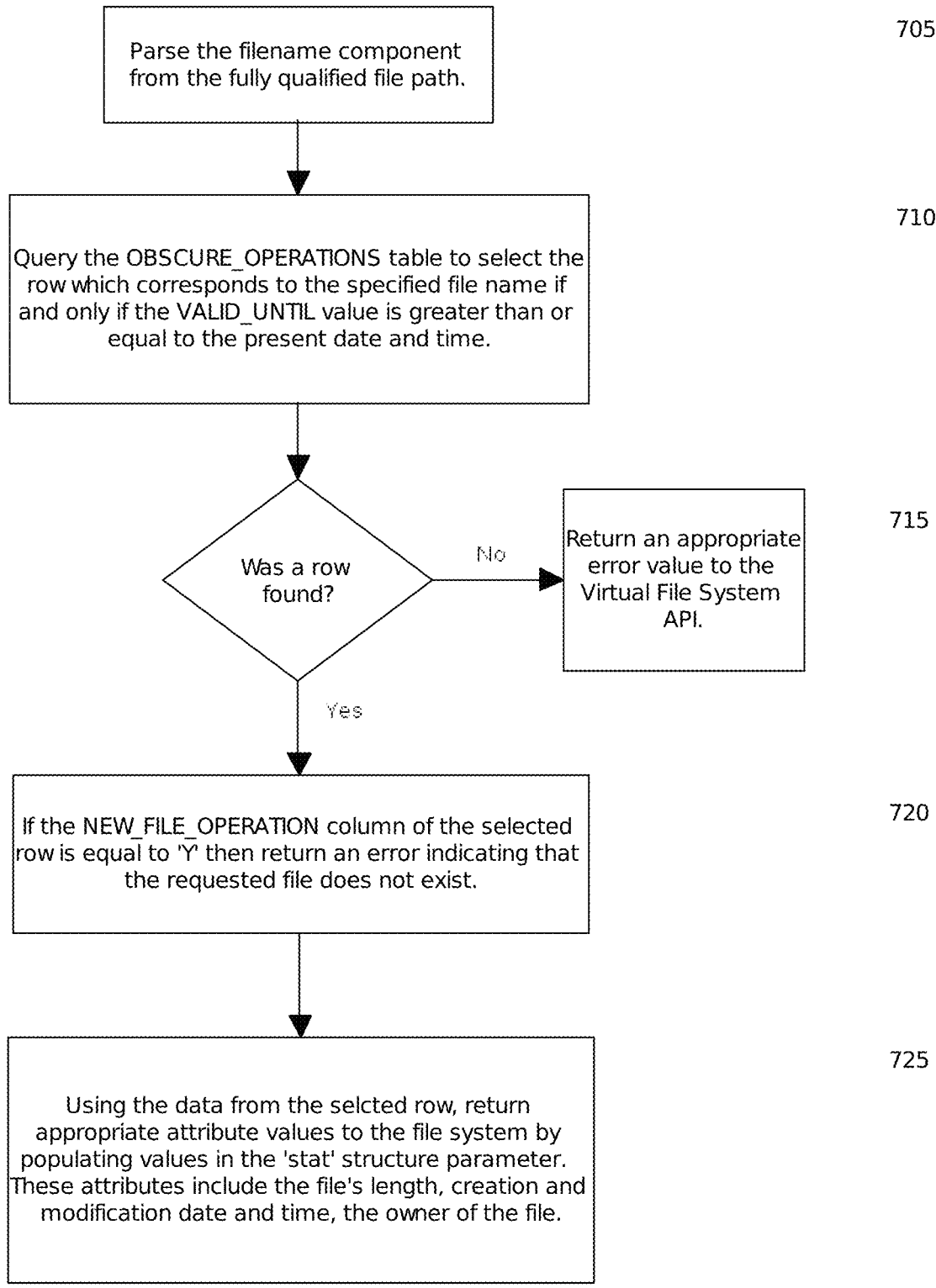
FIG. 7 is a flowchart that describes how a 'get file attributes' request is handled.

As illustrated in FIG. 7, a flowchart 700 of the Get File Attributes operation, detailing how a 'get file attributes' request on a file is handled, is provided.

After it is determined that the file system issued a 'get attributes' request on a file, the Get File Attributes operation is called. The parameters received from the file system are the file path and a 'stat' structure. The 'stat' structure is used to return attribute values to the OS. The file path is parsed to identify the file name 705. The OBSCURE_FILE_OPERATIONS table is queried to select the row where the FILE_KEY corresponds to the specified filename only if the VALID_UNTIL value is greater than or equal to the present date and time 710. If the row was not found, an appropriate error value is returned 715. If the NEW_FILE_OPERATION column of the selected row is equal to 'Y' then an error indicating that the requested file does not exist is returned 720. Using the data from the selected row, appropriate values are returned to the file system by populating values in the stat structure parameter 725. These attributes include values from the columns CREATION_DATE, CONTENT_LENGTH, as well as modification date and time and the owner of the file.

Figure 8:
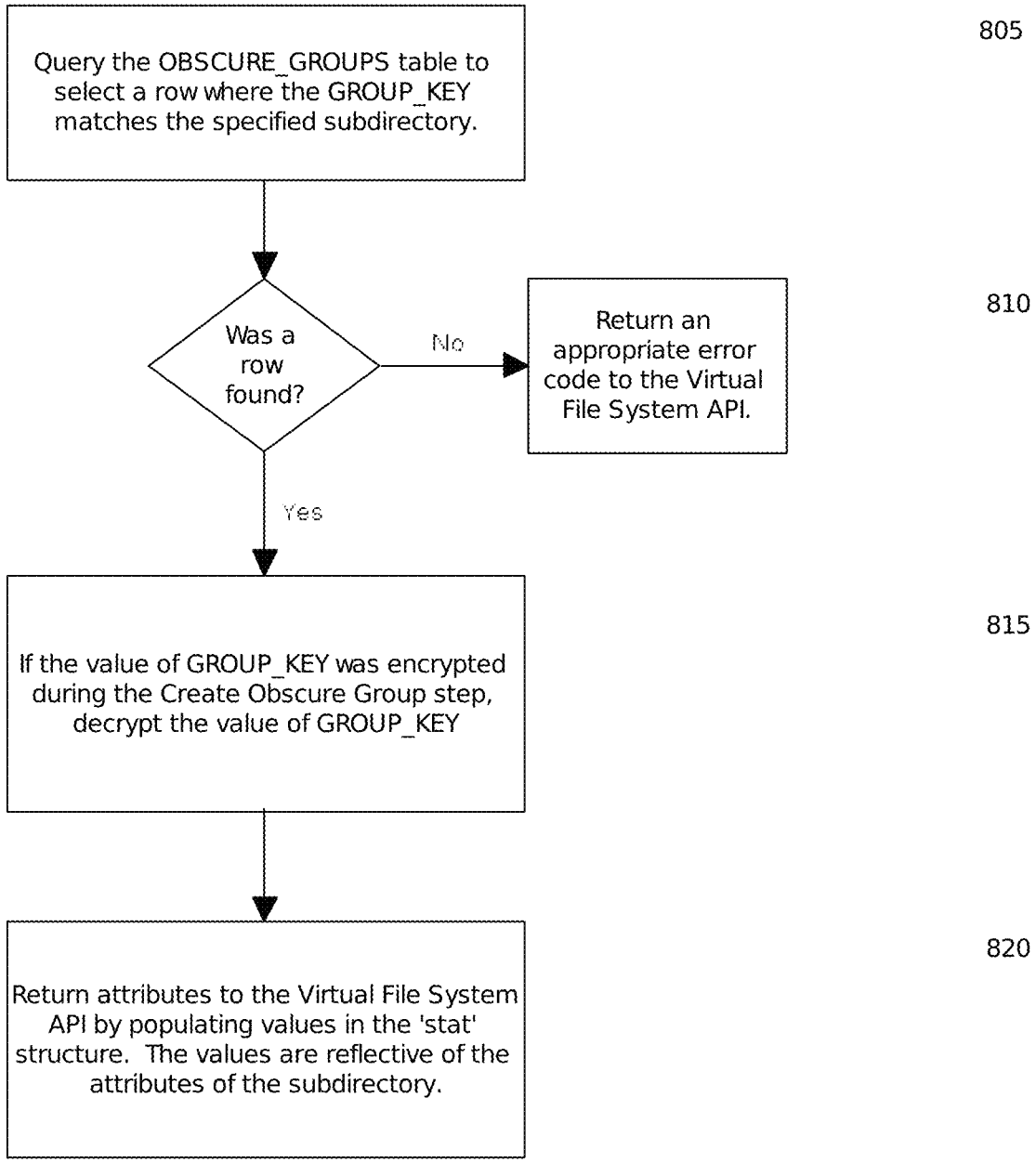
FIG. 8 is a flowchart that describes how a 'get directory attributes' request is handled.

As illustrated in FIG. 8, a flowchart 800 of the Get Subdirectory Attributes operation, detailing how a 'get file attributes' request on a subdirectory is handled, is provided.

After it is determined that the file system issued a 'get attributes' request on a subdirectory, the Get Subdirectory Attributes operation is called. The parameters received from the file system are the file path and a 'stat' structure. The 'stat' structure is used to return attribute values to the OS. The OBSCURE_GROUPS table is queried to select the row where the GROUP_KEY corresponds to the specified subdirectory 805. If the row was not found, an appropriate error value is returned 810. If the value of GROUP_KEY was encrypted during the Create Obscure Group process, the value of the GROUP_KEY is then decrypted 815. Using the data from the selected row, appropriate attribute values from the subdirectory are returned to the file system using the 'stat' structure 820.

Figure 9B:
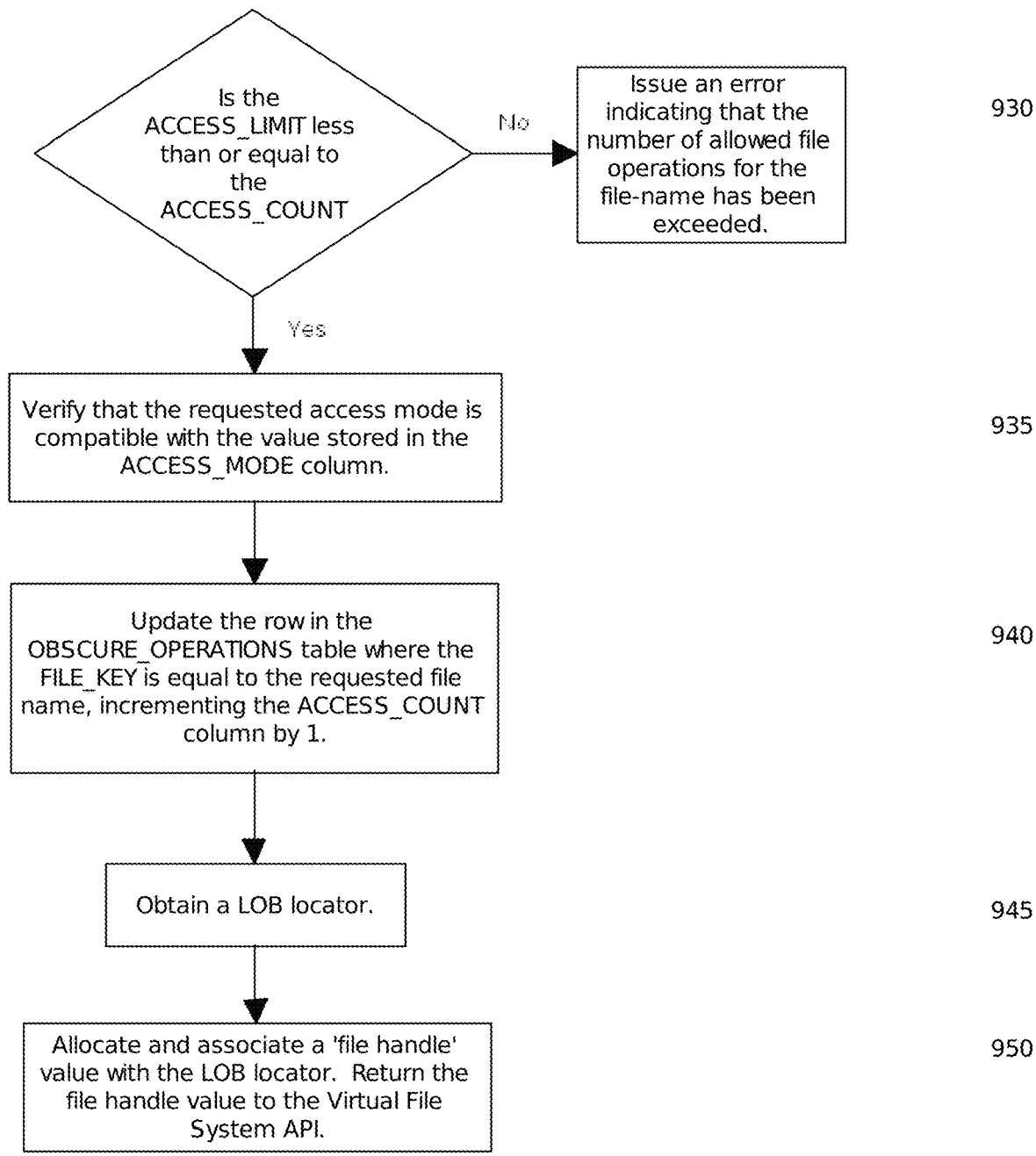

As illustrated in FIGS. 9a and 9b, a flowchart 900 of the Open a File operation, detailing how an 'open file' request is handled, is provided.

The file system issues an 'open file' request. The two parameters received from the file system are the name of the file to open and the requested access mode 905. If a fully qualified file path is received as the first parameter, it is parsed to separate the subdirectory from the actual file name. In embodiments utilizing an obscure groups table, a joined query of the OBSCURE_FILE_OPERATIONS and OBSCURE_GROUPS tables is executed to select the row which corresponds to the passed filename only if the VALID_UNTIL value is greater than or equal to the present date and time 910. Otherwise, in embodiments without the obscure groups table, the same query is executed on only the OBSCURE_FILE_OPERATIONS table. If the row was not found, an appropriate error value is returned 915. Values are retrieved for the columns ACCESS_COUNT, ACCESS_LIMIT, REFERENCE_COUNT, LOCATOR_FUNCTION, LOCATOR_PARAMETER, ON_CLOSE_PROCEDURE, ACCESS_MODE, ENFORCE_SID_SECURITY, ENFORCE_PID_SECURITY, ENFORCE_IP_SECURITY, and GROUP_KEY. The 'Check Security Procedure' is executed using the ENFORCE_SID_SECURITY, ENFORCE_PID_SECURITY, and ENFORCE_IP_SECURITY 920. An appropriate error value is returned if the process fails. If the ACCESS_LIMIT is not equal to −1 925 and ACCESS_LIMIT is less than or equal to the ACCESS_COUNT, an error is returned to the file system indicating that the requested file cannot be accessed 930. This is because the number of allowed file access operations has been exceeded. The requested access mode parameter is verified to be compatible with the value stored in the ACCESS_MODE column 935. The row in the OBSCURE_FILE_OPERATIONS table is updated where the FILE_KEY is equal to the requested filename, incrementing the ACCESS_COUNT and REFERENCE_COUNT column values by 1 940. Using the LOCATOR_FUNCTION and LOCATOR_PARAMETER, an LOB locator is obtained 945. A 'file handle' value is allocated and associated with the LOB locator. The file handle value is returned to the file system 950.

Figure 10:
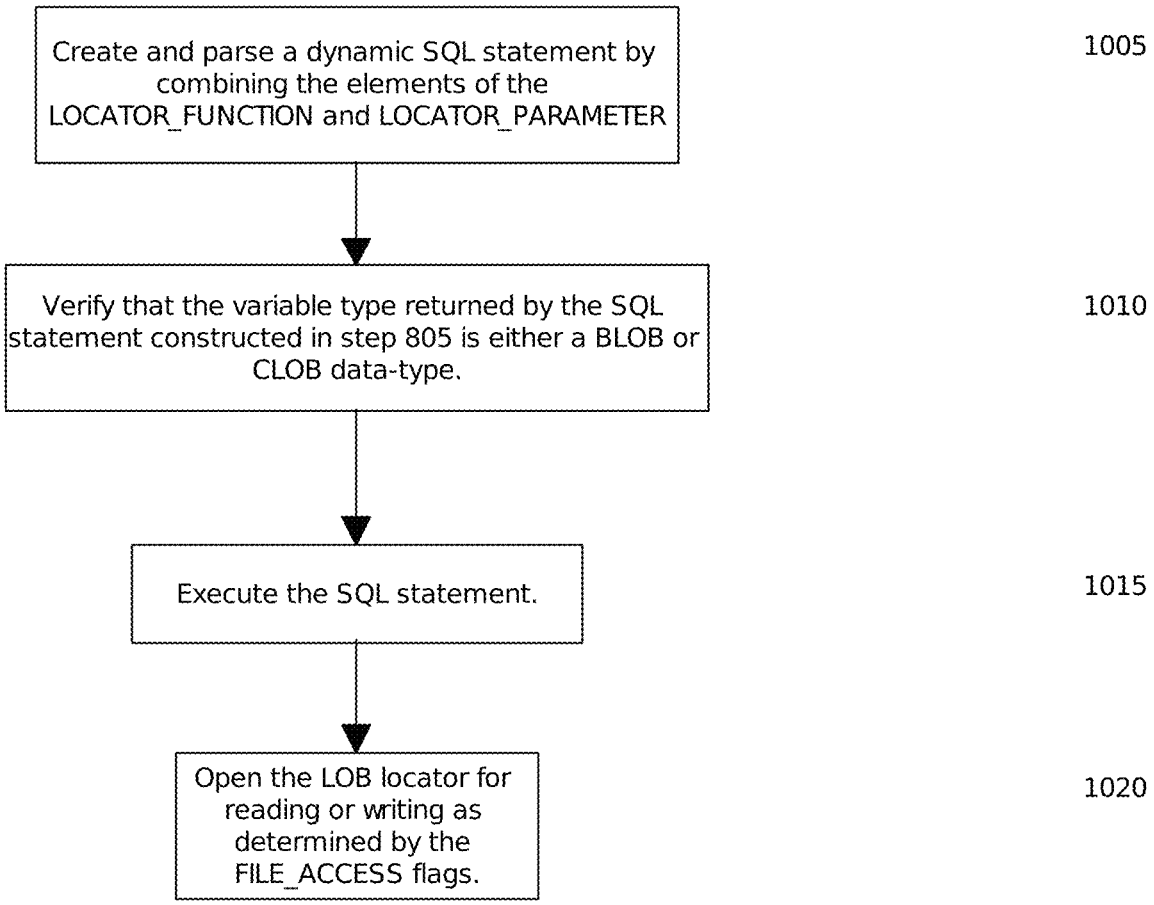
FIG. 10 is a flowchart that describes how an LOB locator is obtained.

Expanding on 945, as illustrated in FIG. 10, a flowchart 1000, detailing how an LOB locator is obtained, is provided.

SQL statements do not return LOB data directly; instead, they return a locator that can be used in subsequent 'read' or 'write' functions. A dynamic SQL statement is created by combining the elements of the LOCATOR_FUNCTION and LOCATOR_PARAMETER 1005. If the database function named by the value of the LOCATOR_FUNCTION cannot be found, an appropriate error value is returned. The signature for the function should contain one return value and should accept at most one parameter. If the signature is invalid, an appropriate error is returned. The variable type returned by the dynamically built SQL statement is verified to be a LOB datatype 1010. The SQL statement is executed 1015. The LOB locator can now be opened for reading or writing as determined by the FILE_ACCESS flags 1020.

As illustrated in FIG. 11, a flowchart 1100 of the Read Data from a File operation, detailing how a 'read file' request is handled, is provided.

The file system issues a 'read file' request. The four parameters received from the file system are the file handle previously returned by the open function, buffer location, buffer length, and file offset 1105. The process attempts to find the LOB locator associated with the specified file handle (that was previously returned by the open function) 1110. If the LOB Locator is not found, then an appropriate error value is returned to the file system 1115. Otherwise, the requested amount of data starting at the 'file offset' is read. The amount of data read is specified by the 'buffer length' parameter. The data read from the database is received and stored at the address specified by the 'buffer location' value. The number of bytes read is returned to the file system 1120.

Figure 12:
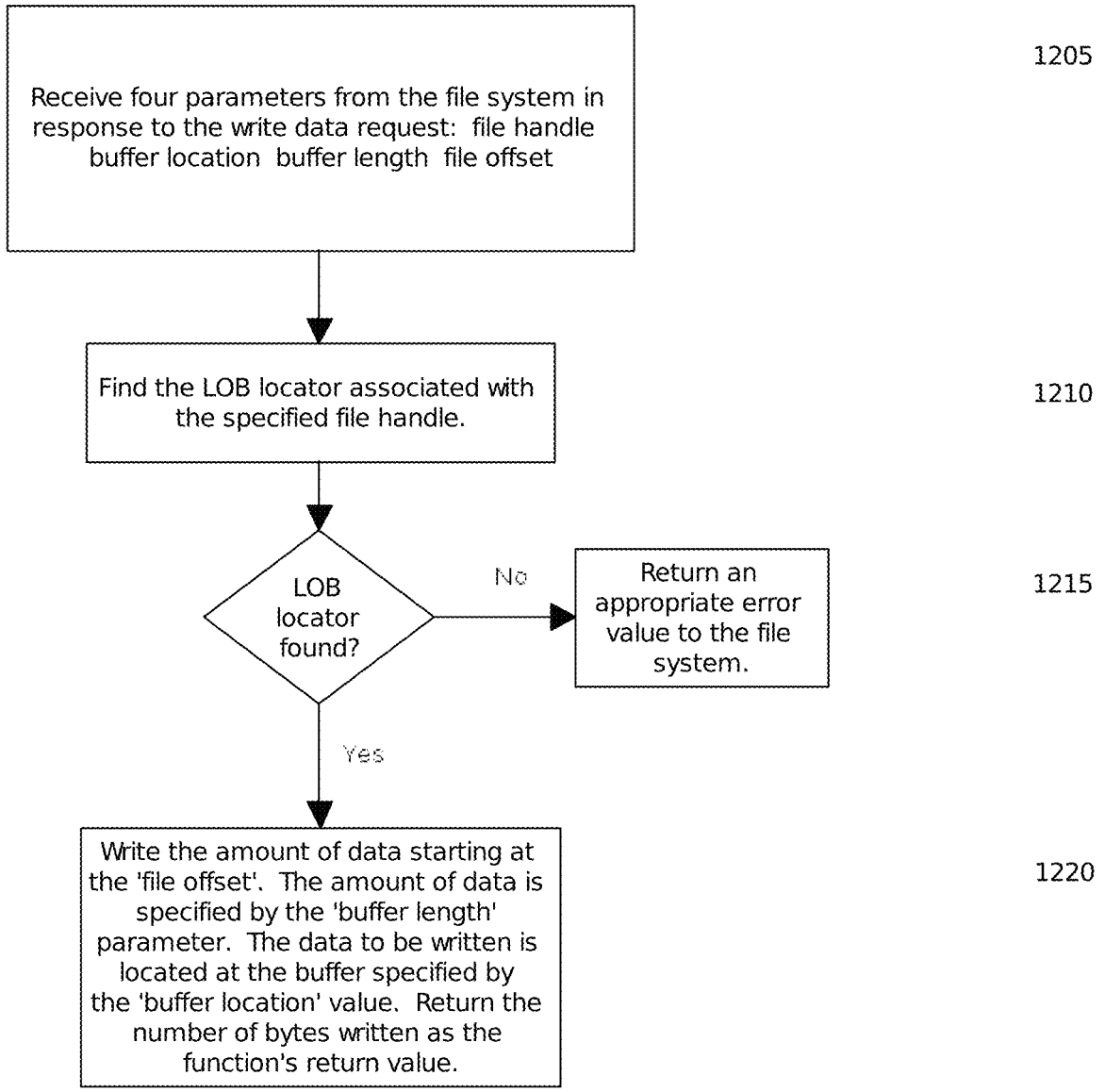
FIG. 12 is a flowchart that describes how a 'write file' request is handled.

As illustrated in FIG. 12, a flowchart 1200 of the Write Data to a File operation, detailing how a 'write file' request is handled, is provided.

The file system issues a 'write file' request. The four parameters received from the file system are file handle previously returned by the open function, buffer location, buffer length, and file offset 1205. The process attempts to find the LOB locator associated with the specified file handle (that was previously returned by the open function) 1210. If the LOB Locator is not found, then an appropriate error value is returned to the file system 1215. Otherwise, the data will be written to the LOB in the database beginning at the 'file offset'. The amount of data is specified by the 'buffer length' parameter. The data to be written is located at the buffer specified by the buffer location value. The number of bytes written is returned to the file system 1220.

Figure 13:
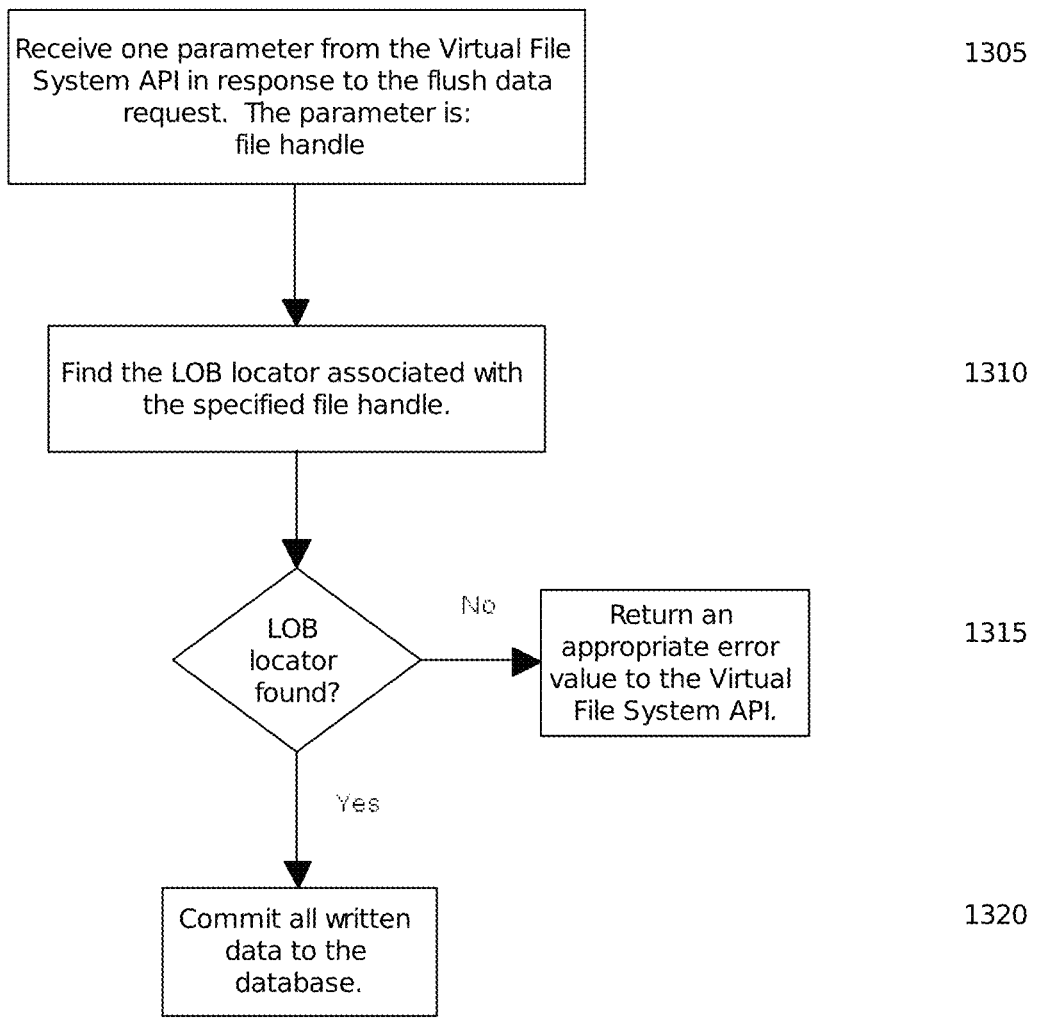
FIG. 13 is a flowchart that describes how a 'flush buffered data' request is handled.

As illustrated in FIG. 13, a flowchart 1300 of the Flush Buffered Data operation detailing how a 'flush buffered data' request is handled, is provided.

The file system issues a 'flush buffered data' request. The parameter received from the file system is the file handle previously returned by the open function 1305. The process attempts to find the LOB locator associated with the specified file handle 1310. If the LOB Locator is not found, then an appropriate error value is returned to the file system 1315. Otherwise, all written data is committed to the database 1320.

Figure 14:
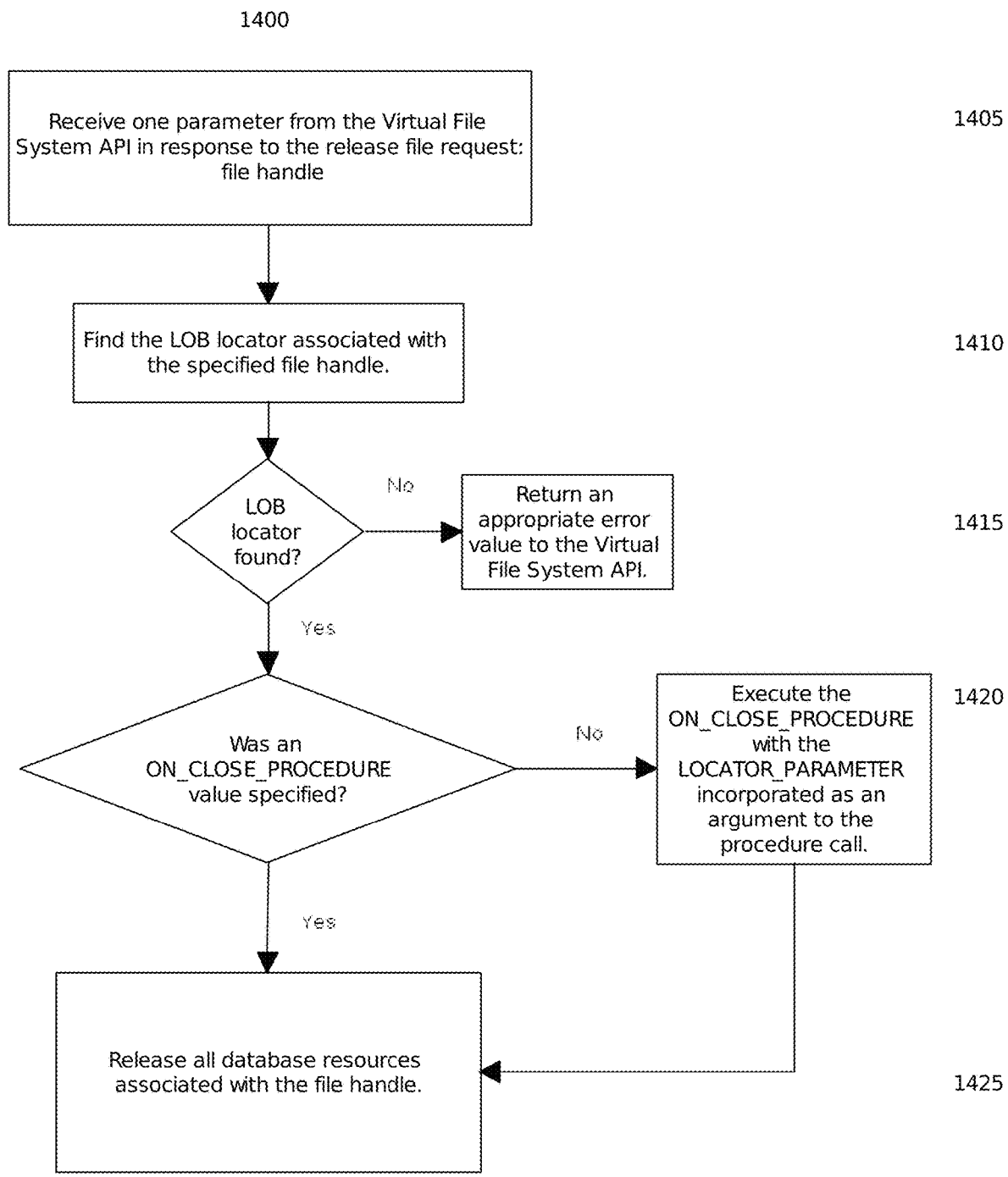
FIG. 14 is a flowchart that describes how a 'close file' request is handled.

As illustrated in FIG. 14, a flowchart 1400 of the Close File/Release File operation, detailing how a 'close file' request is handled, is provided.

The file system issues a 'close file' request. The parameter received from the file system is the file handle previously returned by the open function 1405. The process attempts to find the LOB locator associated with the specified file handle 1410. If the LOB Locator is not found, then an appropriate error value is returned to the file system 1415. If the ON_CLOSE_PROCEDURE value was specified, the ON_CLOSE_PROCEDURE is dynamically built and executed with the LOCATOR_PARAMETER incorporated as an argument to the database procedure call. Then, all database resources associated with the file handle are released 1420. The process closes the LOB locator, decrements the reference count, releases any resources acquired during the other processes (Open, Read and Write), and commits its work to the database.

Figure 15:
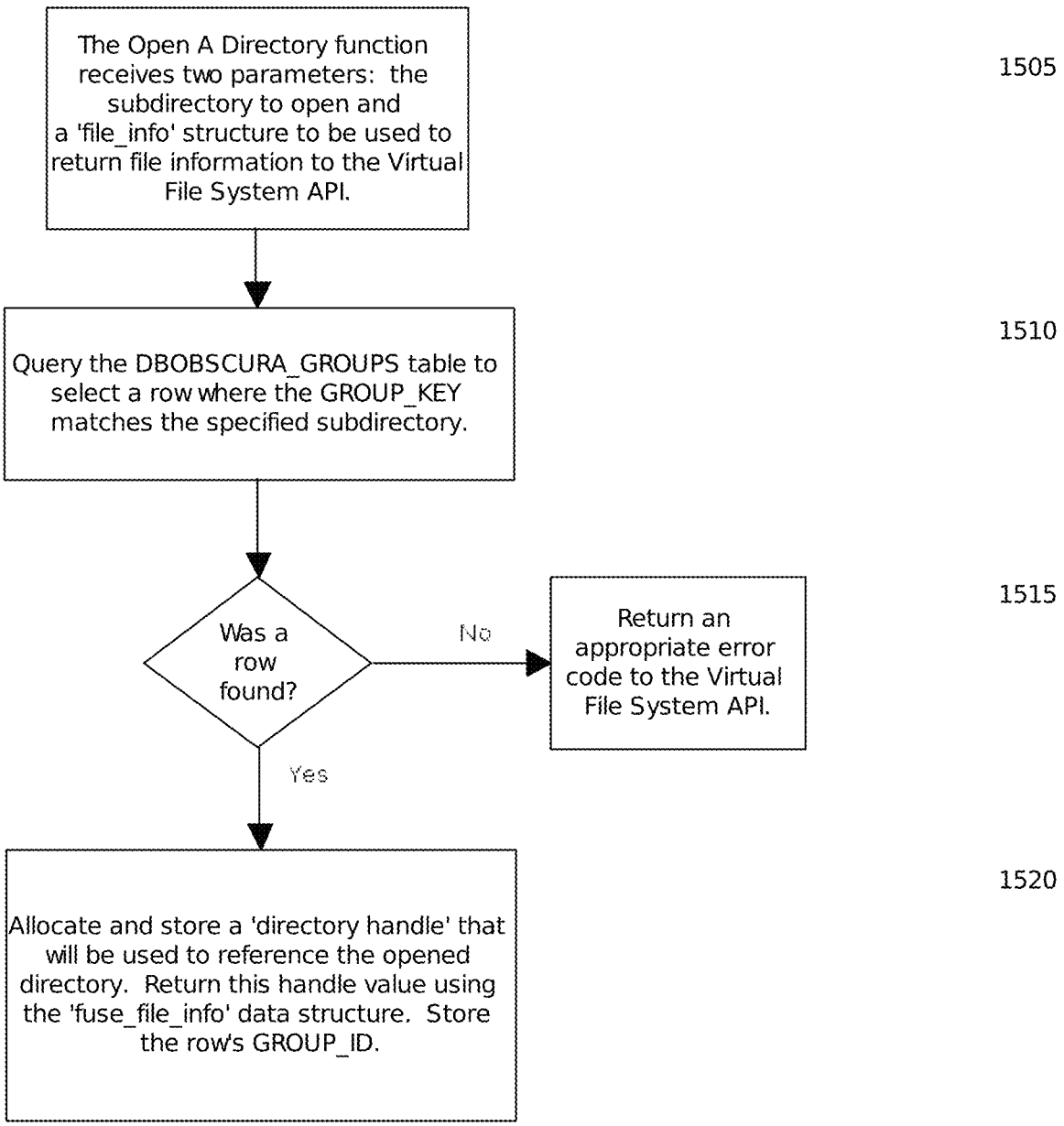
FIG. 15 is a flowchart that describes how an 'open directory' request is handled.

As illustrated in FIG. 15, a flowchart 1500 of the Open a Directory operation, detailing how an 'open directory' request is handled, is provided.

The file system issues an 'open directory' request. The two parameters received from the file system are the name of the subdirectory to open and a file info structure used to return file info to the file system 1505. The OBSCURE_GROUPS table is queried to select the row where the GROUP_KEY corresponds to the specified subdirectory 1510. If a row was not found, an appropriate error value is returned 1515. A directory handle value is allocated and stored to reference the opened directory. The row's GROUP_ID is stored with the allocated directory handle as well. The directory handle value is returned to the file system using the file info data structure to be used in subsequent Read Directory and Close Directory functions. 1520

Figure 16:
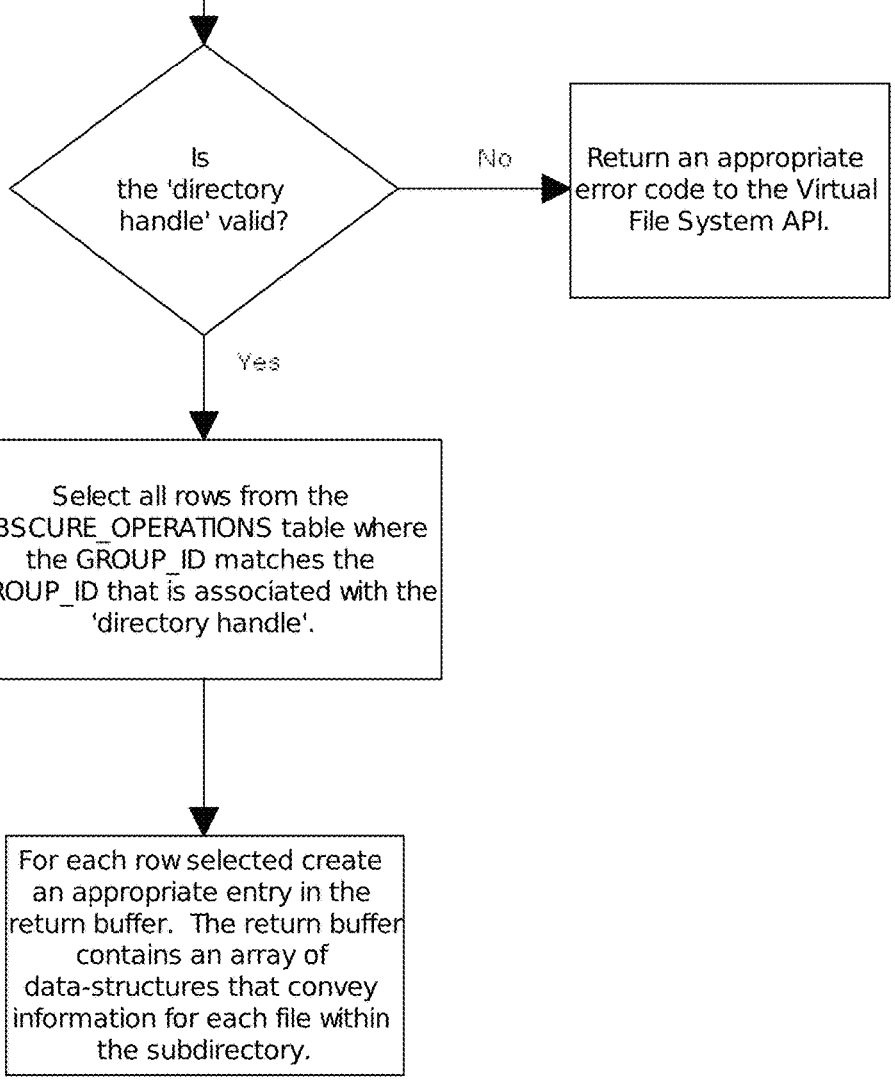
FIG. 16 is a flowchart that describes how a 'read directory' request is handled.

As illustrated in FIG. 16, a flowchart 1600 of the Read a Directory's Contents operation, detailing how a 'read directory' request is handled, is provided.

The file system issues a 'read directory' request. The two parameters received from the file system are a buffer to be used to return information regarding the files contained in the directory and a file info data structure. The file info data structure contains the directory handle previously returned by the 'open directory' function 1605. If the directory handle is not a valid open directory, then an appropriate error value is returned to the file system 1610. The OBSCURE_OPERATIONS table is queried to select all rows where the GROUP_ID corresponds to the GROUP_ID that is associated with the directory handle in the file structure 1615. For each row selected, an appropriate entry in the return buffer is created 1620. The return buffer contains an array of data structures that store information for each file within the subdirectory.

Figure 17:
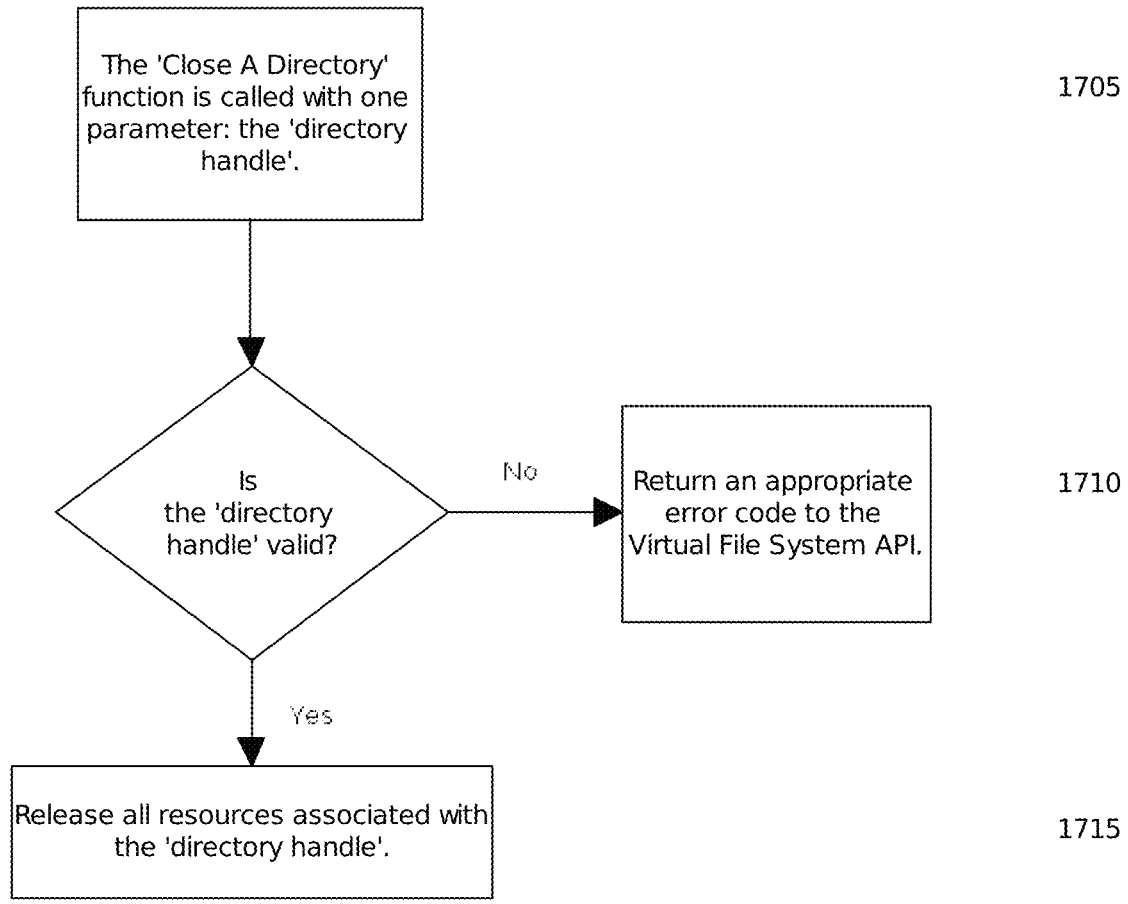
FIG. 17 is a flowchart that describes how a 'close directory' request is handled.

As illustrated in FIG. 17, a flowchart 1700 of the Close Directory operation, detailing how a 'close directory' request is handled, is provided.

The file system issues a 'close directory' request. The parameter received from the file system is a directory handle returned by the 'open directory' function 1705. If the directory handle is not a valid open directory, then an appropriate error value is returned to the file system 1710 Otherwise, all database resources acquired during the Open Directory and Read Directory functions and associated with the file handle are released 1720.

In some embodiments, to increase security, it may be desirable to check the user's permission to access the file group. This is done by using ID values that have been encoded into the GROUP_KEY 410. In embodiments where there is no subdirectory specification, ID values can be encoded into the FILE_KEY instead. Such ID values include the system process ID, database session ID and the IP address. For each ID value, a security flag can be set to require that the client's ID match the value on the GROUP_KEY.

Figure 18A:
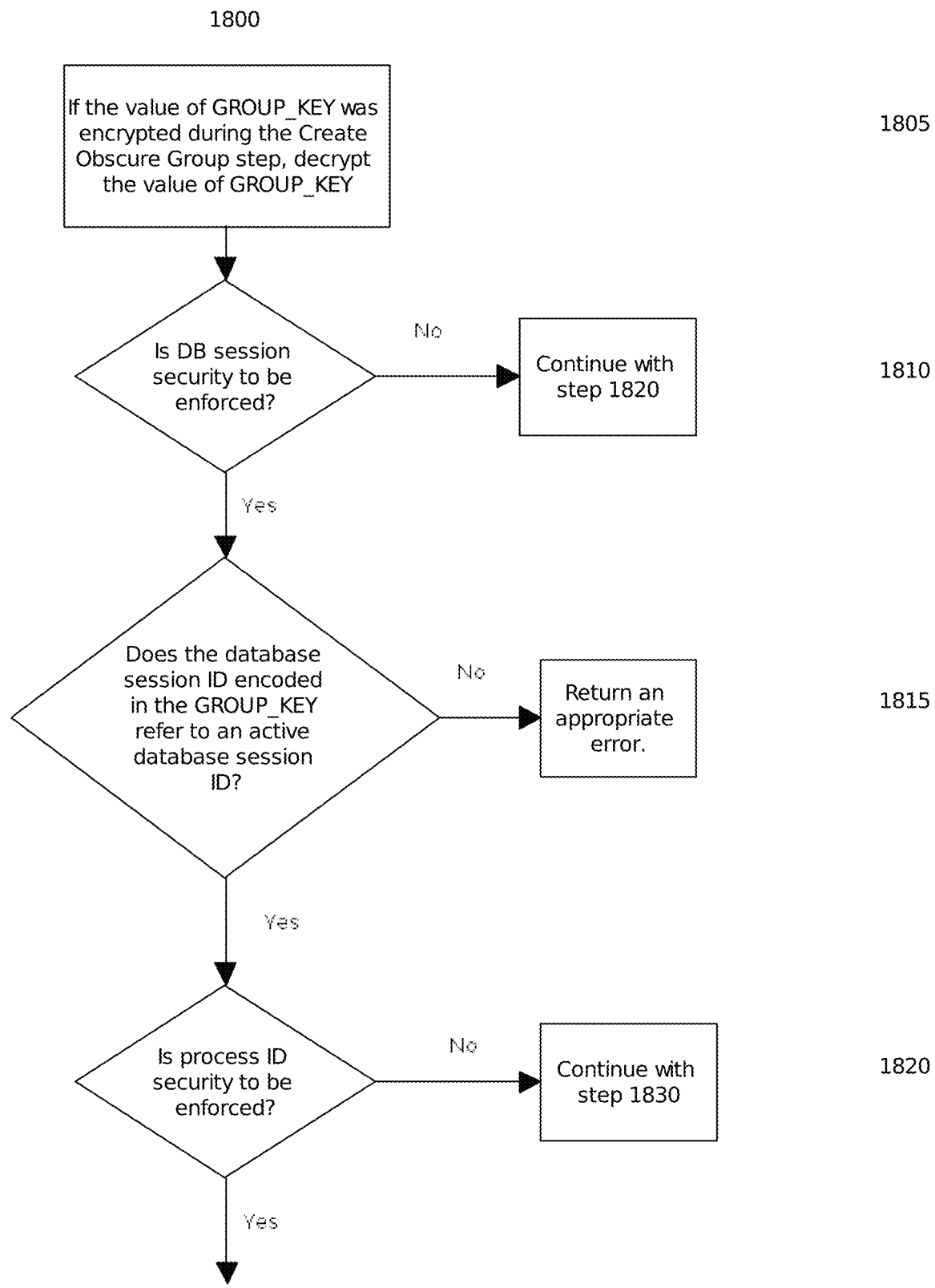
FIGS. 18a and 18b are a flowchart that describes how the encoded security values are checked.
Figure 18B:
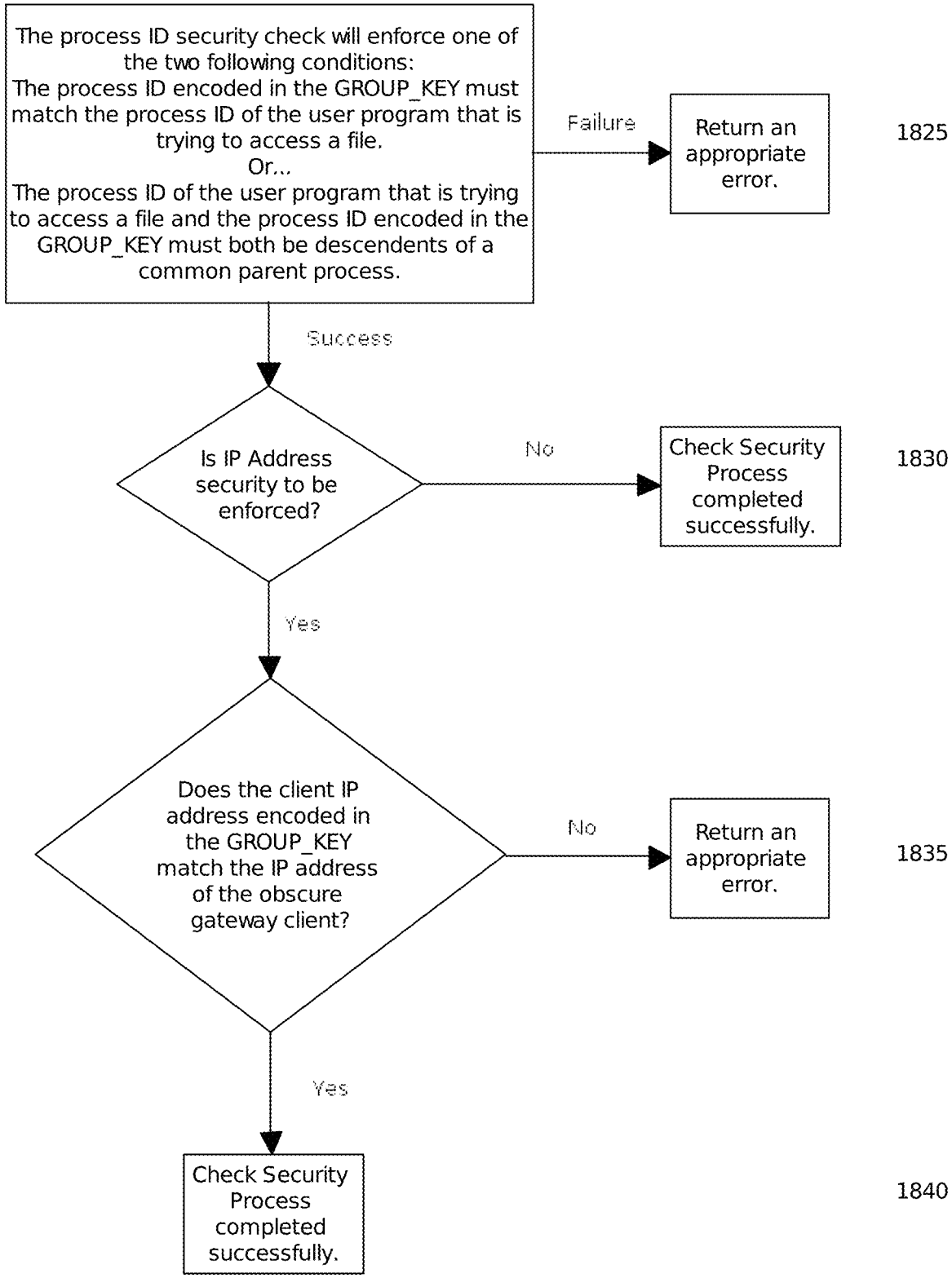

Expanding on 920, as illustrated in FIG. 18, a flowchart 1800, detailing how the security of user ID values are checked, is provided.

Security on user ID values can be enforced during the 'Open a File' process. If the value of GROUP_KEY was encrypted during the Create Obscure Group Process, the value of the GROUP_KEY is first decrypted 1805. In embodiments where there is no subdirectory specification, the FILE_KEY is used instead of the GROUP_KEY used. If database session ID security is enforced (ENFORCE_SID_SECURITY='Y') 1810, it is required that the database session ID encoded in the GROUP_KEY refer to an active session ID 1815. Otherwise, an appropriate error that the database session ID values do not match is returned. If database session ID security is not enforced (ENFORCE_SID_SECURITY='N') 1810, it is not necessary to check the database session ID. If system process ID security is enforced (ENFORCE_PID_SECURITY='Y') 1820, it is required that the system process ID encoded in the GROUP_KEY refer to an active client system process ID or process group ID 1825. Otherwise, an appropriate error that the system process ID values do not match is returned. If system process ID security is not enforced (ENFORCE_PID_SECURITY='N') 1820, it is not necessary to check the system process ID. If IP address security is enforced (ENFORCE_IP_SECURITY='Y') 1830, it is required that the client IP address encoded in the GROUP_KEY match the IP address of the obscure gateway client 1835. Otherwise, an appropriate error that the IP address values do not match is returned. If IP address security is not enforced (ENFORCE_IP_SECURITY='N') 1830, it is not necessary to check the IP address. If all security checks pass, it is indicated that the Check Security Procedure completed successful 1840.

After an obscure file operation is enrolled, the LOB data can be accessed and manipulated using the File I/O Operations. Examples of how a client and user program might interact with the obscure file gateway follow.

As illustrated in FIG. 19, a flowchart 1900, showing how a client/user program might enroll and process a single file operation within the obscure file gateway, is provided.

The client program calls 'Enroll Obscure File Access Operation' function with appropriate parameter values to enable enrollment of a file operation within the obscure file gateway 1905. This can be done by executing a stored database function similar to: obscure_file_name:=enroll_obscure_file( . . . ). The program can get the attributes of the file. To do this, the OS forwards the 'get attribute' call to the 'Get File Attributes' operation. The 'Get File Attributes' operation returns the file's attributes to the OS. The OS returns the file's attributes to the calling program. The program opens the file using the random filename returned by 'Enroll Obscure File Operation' process 1910. To do this, the OS forwards the 'open' call to the 'Open a File' operation. The 'Open a File' operation locates the requested data and returns a file handle to the OS. The OS returns the file handle to the calling program. The user program can then perform other I/O operations upon the file by calling the 'Read a File' and 'Write a File' operations 1915. The program reads and/or writes data to the file referenced by the returned file handle. To do this, the OS forwards the request to the 'Read Data from a File' or 'Write Data to a File' operation, as appropriate. The 'Read Data from a File' and 'Write Data to a File' operations perform the requested action. The OS returns a value to the calling program indicating the number of bytes read/written. The program flushes all written data. To do this, the OS forwards the 'flush' request to the 'Flush all Buffered Data' operation. The 'Flush all Buffered Data' operation commits all data for the current obscure operation to the database. The user program closes the file by calling the 'Close a File' function 1920. To do this, the OS forwards the 'close' request to the 'Close the File' operation. The 'Close the File' operation performs its prescribed Actions.

Figure 20A:
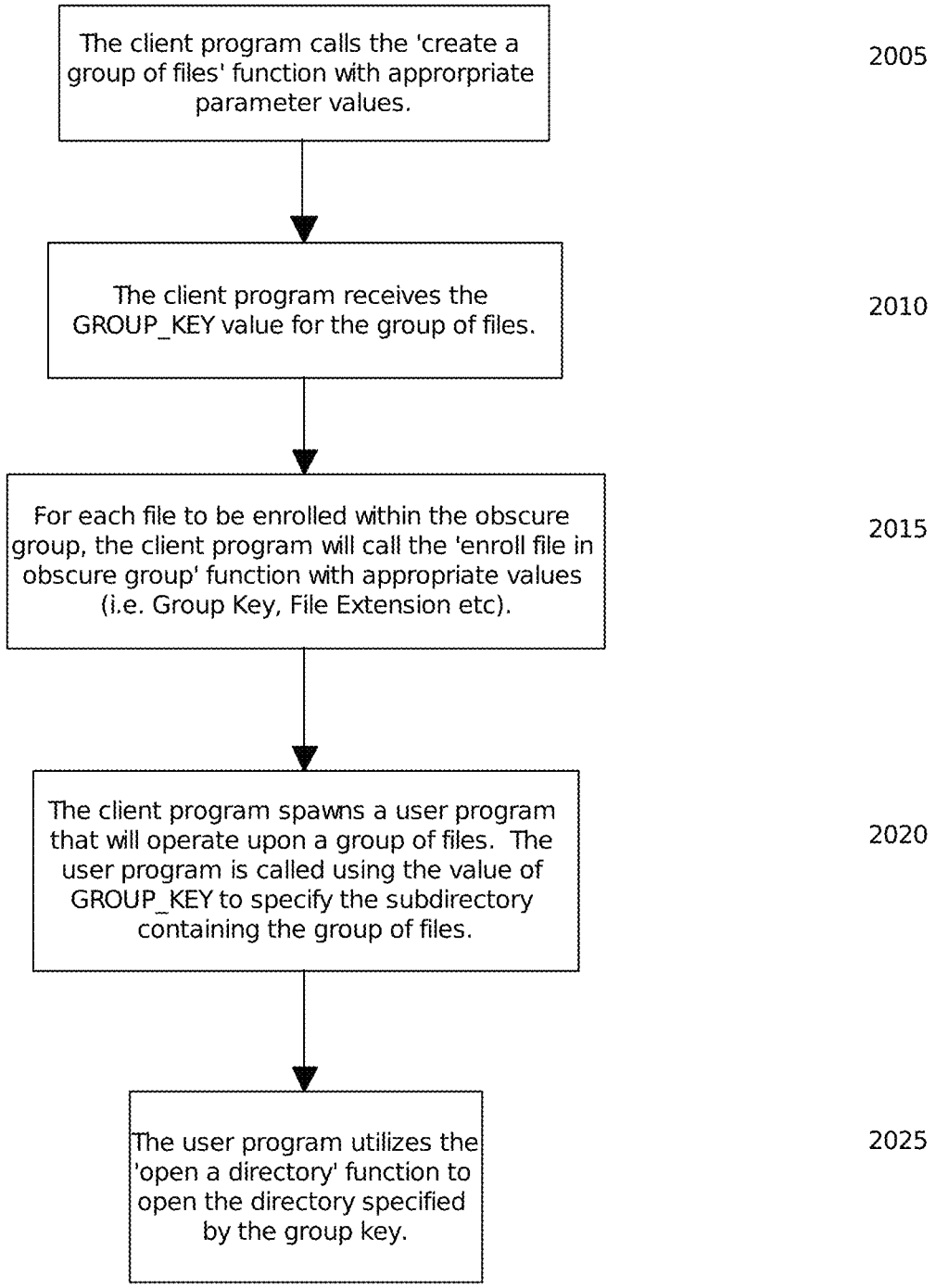
FIGS. 20a and 20b are a flowchart that describes how a program might interact with a group of files in the obscure file gateway.
Figure 20B:
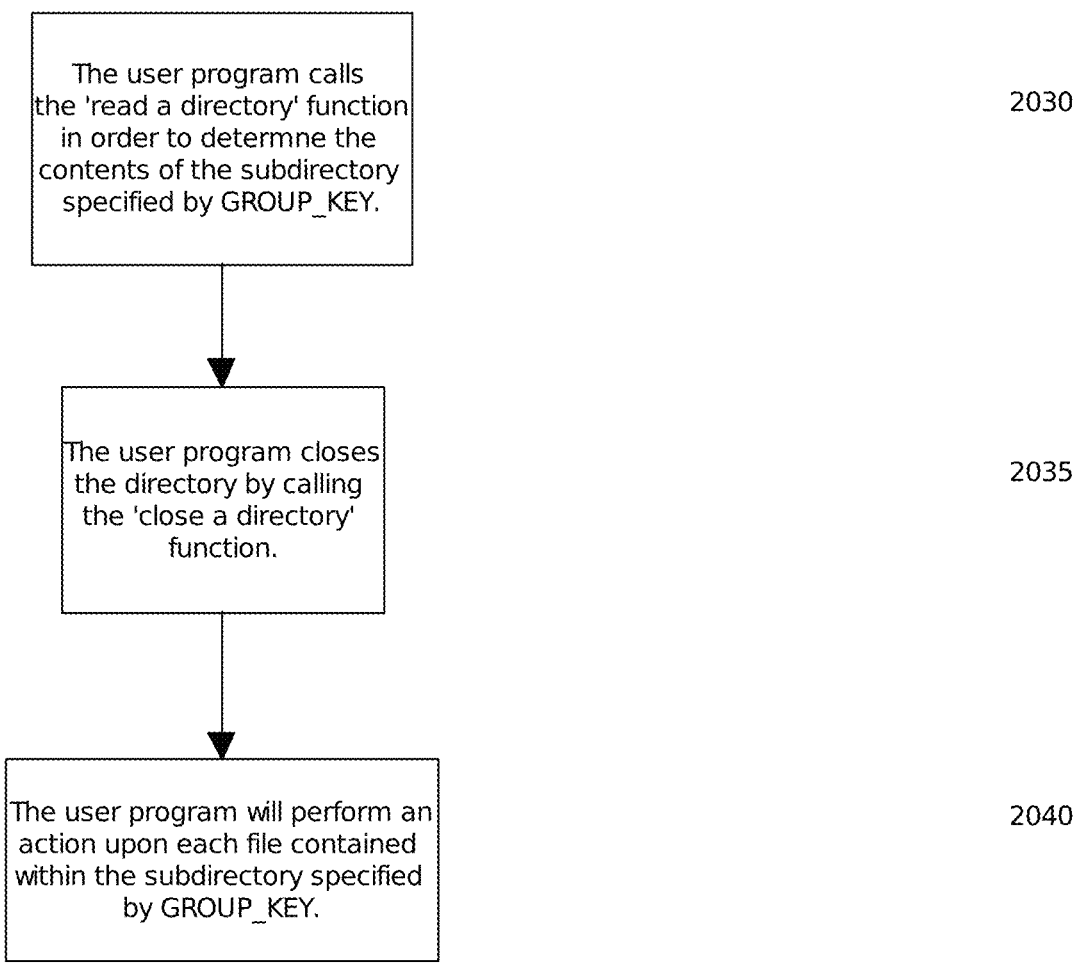

As illustrated in FIG. 20, a flowchart 2000, showing how a client/user program might enroll and process a group of files within the obscure file gateway, is provided.

The client program calls 'Create a Group of Files' function with appropriate parameter values 2005. This can be done by executing a stored database function similar to: obscure_group:=enroll_obscure_group( . . . ). The client program receives back the GROUP_KEY value for the group of files 2010. For each file to be enrolled within the obscure group, the client program will call the 'Enroll File in Obscure Group' function with appropriate values 2015. It is then possible to generate a command line that incorporates the group name returned by the 'Enroll Group of Files' operation in order to call/spawn a cooperative Program 2020. The user program is called using the GROUP_KEY to specify the subdirectory containing the group of files. The program may get the attributes of the directory specified by the group key. To do this, the OS forwards the 'get attribute' call to 'Get Subdirectory Attributes' operation. The 'Get Subdirectory Attributes' operation returns the subdirectory's attributes to the OS. The OS returns the subdirectory's attributes to the calling program. The user program utilizes the 'Open a Directory' function to opens the directory specified by the group key 2025. To do this, the OS forwards the 'open' call to the 'Open a Directory' operation. The 'Open a Directory' operation locates the requested data and returns a directory handle to the OS. The OS returns the directory handle to the calling program. The user program calls the 'Read a Directory' function in order to determine the contents of the subdirectory specified by the group key 2030. To do this, the OS forwards the request to the 'Read a Directory' operation. The 'Read a Directory' operation performs the requested action. The OS returns a buffer to the calling program containing information for each file contained in the subdirectory. The user program closes the directory by calling the 'Close a Directory' function 2035. To do this, the OS forwards the close request to the 'Close a Directory' operation. The 'Close a Directory' operation performs its prescribed actions. The user program can then perform an action upon each file contained within the subdirectory specified by the group key 2040.

Figure 21:
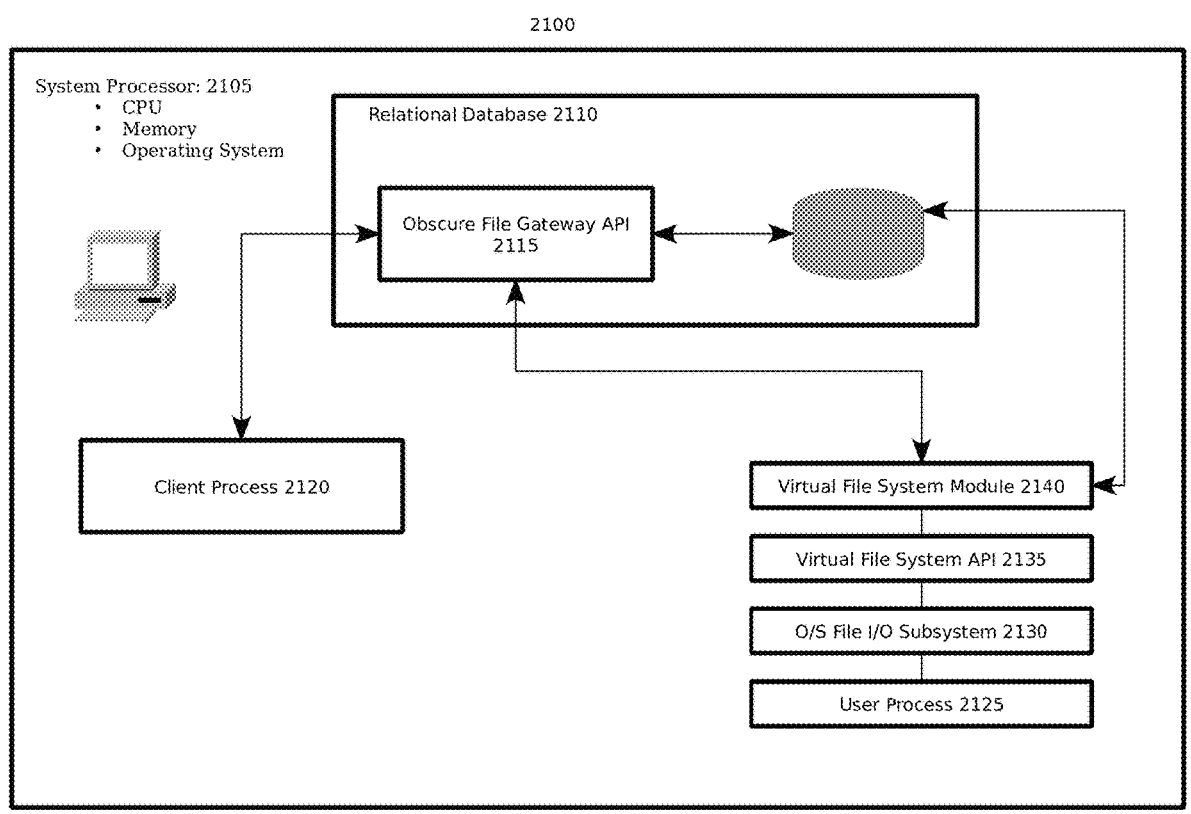
FIG. 21 is a block diagram of a general embodiment on a single computer.

As illustrated in FIG. 21, a block diagram 2100 of a general embodiment on a single computer device, is provided.

A general embodiment on a single computer is presented. In the depicted embodiment, one system processor 2105 performs all necessary tasks. Some components of the computer include a CPU, memory (hard disk, random access memory cache memory, etc.), an OS able to handle I/O requests, and a relational database 2110. The processor executes the client process 2120, which interfaces with the obscure file gateway API 2115 to enroll an entry with the gateway. The processor also performs the user process 2125 by executing a user application to read the file that has been enrolled in the obscure file gateway. File I/O requests are forwarded through the file I/O subsystem 2130 to the virtual file system API 2135 and the virtual file system module 2140, which perform the necessary file requests on the file. The user process and client process can be executed as two separate and distinct applications or as a single application.

Figure 22:
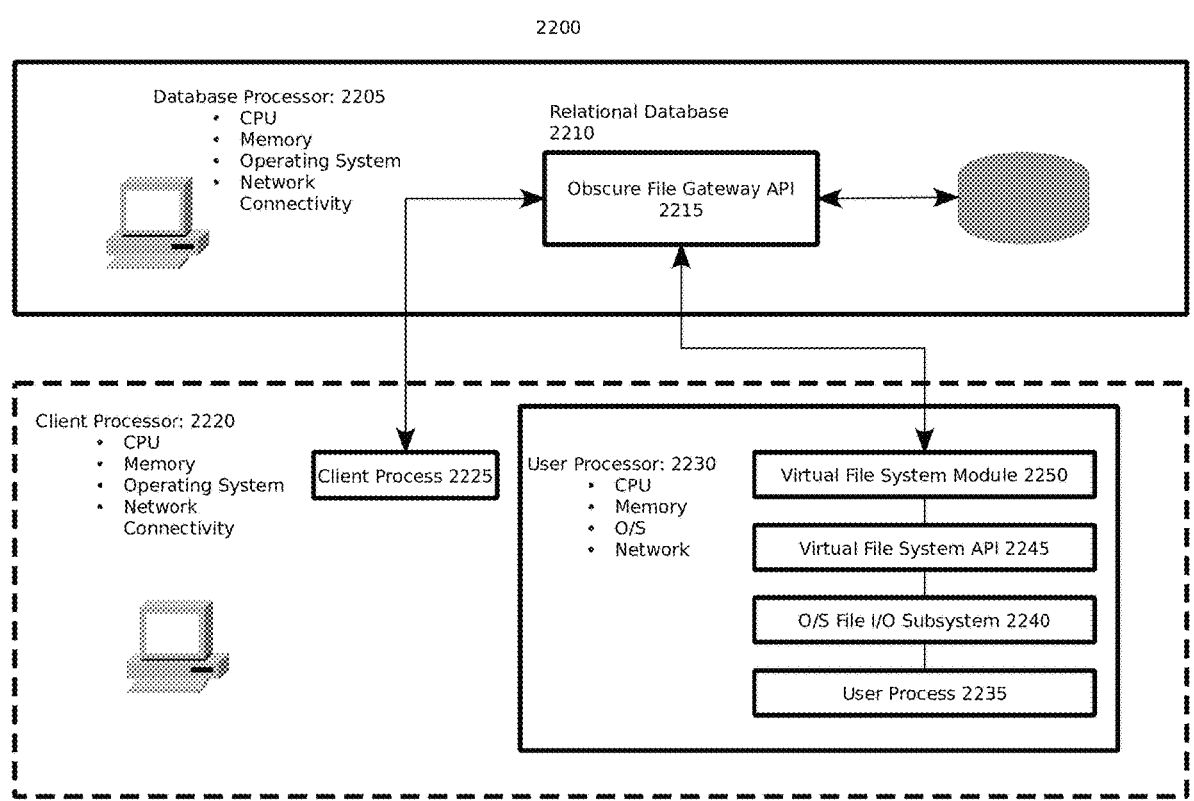
FIG. 22 is a block diagram of a general embodiment across multiple computers.

As illustrated in FIG. 22, a block diagram 2200 of an embodiment across multiple computer devices, is provided.

An embodiment over two or more computers is presented. In the depicted embodiment, two or more processors perform all necessary tasks. Some components of the computers include a CPU, memory (hard disk, random access memory cache memory, etc.), an OS able to handle I/O requests, and network connectivity. Additionally, a relational database 2210 is located on the database processor computer 2205. The client processor 2220 executes the client process 2225, which interfaces across a computer network with the obscure file gateway API 2215 to enroll an entry with the gateway. The obscure file gateway API 2215 is implemented by a database processor 2205. The user processor 2230 performs the user process 2135 by executing a user application to read the file that has been enrolled in the obscure file gateway. File I/O requests are forwarded through the file I/O subsystem 2240 to the virtual file system API 2245 and the virtual file system module 2250, which perform the necessary file requests on the file. The user processor and client processor can be a single computer. Alternatively, there can be one or more client processor computers and one or more user processor computers. If the client and user processor are implemented as a single computer, the user process and client process can be executed as two separate and distinct applications or as a single application.

Figure 23:
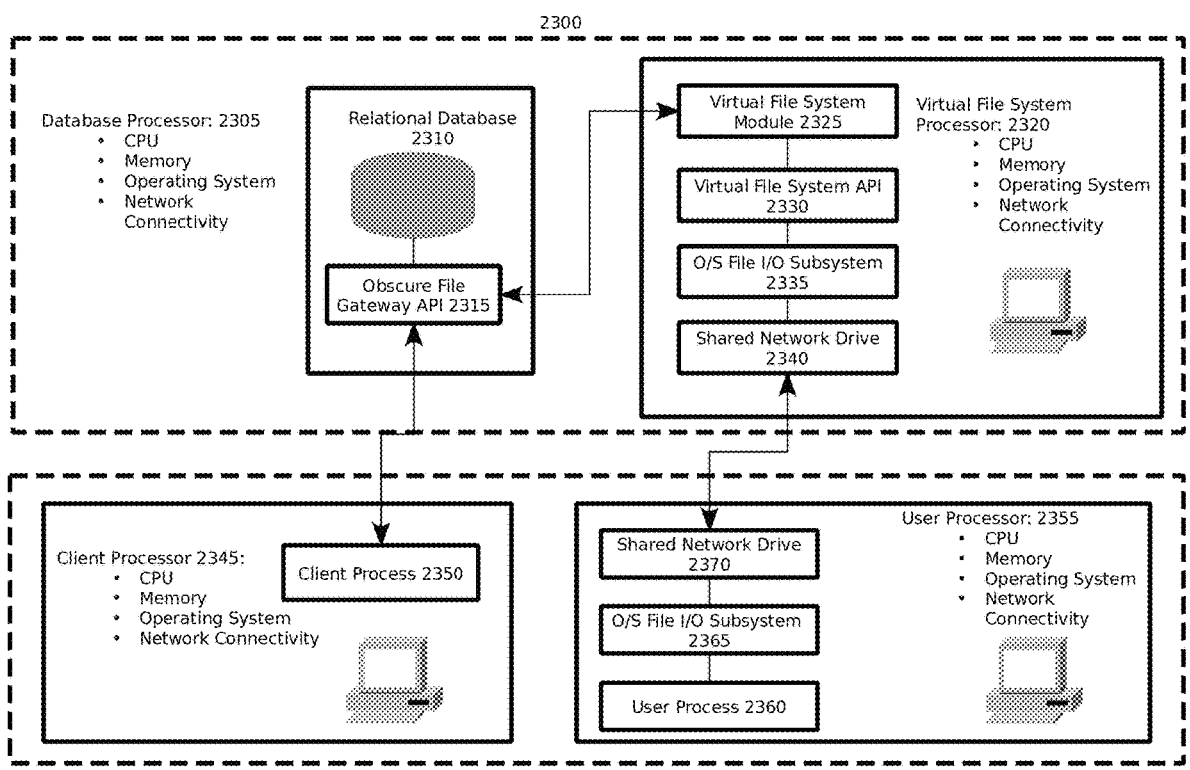
FIG. 23 is a block diagram of an alternative embodiment across multiple computers.

As illustrated in FIG. 23, a block diagram 2300 of an alternative configuration on multiple computer devices, is provided.

An alternative embodiment over two or more computers is presented. In the depicted embodiment, two or more processors perform all necessary tasks. Some components of the computers include a CPU, memory (hard disk, random access memory cache memory, etc.), an OS able to handle I/O requests, and network connectivity. Additionally, a relational database 2210 is located on the database processor computer 2305. The client processor 2345 executes the client process 2350, which interfaces across a computer network with the obscure file gateway API 2315 to enroll an entry with the gateway. The obscure file gateway API 2315 is implemented by a database processor 2305. The user processor 2255 performs the user process 2360 by executing a user application to read the file that has been enrolled in the obscure file gateway. The user processor 2355 utilizes a shared network drive 2370 that has been mapped to the obscure file gateway shared by a virtual file system processor 2320 via its shared network drive 2340. File I/O requests are forwarded through the file I/O subsystem 2335 to the virtual file system API 2340 and the virtual file system module 2345, implemented by a virtual system processor 2320, which perform the necessary file requests on the file. The database processor and virtual file system processor can be a single computer or two separate and distinct computers. The user processor and client processor can be a single computer. Alternatively, there can be one or more client processor computers and one or more user processor computers. If client and user processor are implemented as a single computer, the user process and client process can be executed as two separate and distinct applications or as a single application.

The preceding description contains embodiments of the invention and no limitation of the scope is thereby intended.

That which is claimed is:

1. A method comprising:
enrolling, by a processor, access to a data object in a database for a client application by:
a) retrieving from the database a set of data describing a data object;
b) generating a filename using the retrieved data and a file extension supplied by the client application;
c) correlating the filename with the data object;
receiving from a program, by a file system module, File I/O requests specifying the filename that perform File I/O actions on a file in a file system;
translating, by a processor, the received File I/O requests into Data Operations that perform equivalent File I/O actions on data in a database;
executing, by a processor, the Data Operations on the data object in the database, correlated with the filename.

2. A method of claim 1 further comprising:
first, spawning, by a processor, a user program that accesses file-based data;
wherein the received File I/O Requests are from the user program.

3. The method of claim 1 further comprising:
after correlating the filename with the data object, restricting use of the filename to access the data object after a specific date.

4. The method of claim 1 further comprising:
after correlating the filename with the data object, restricting use of the filename to access the data object after the data object has been accessed a specific number of times.

5. The method of claim 1, wherein the generated filename includes a subdirectory specification.

6. The method of claim 1, wherein the filename is generated from user supplied text.

7. The method of claim 1, wherein the filename is randomly generated.

8. The method of claim 1, wherein the filename is a combination of user supplied text and randomly generated characters.

9. The method of claim 1, wherein a database session ID is used to generate the filename;
and further comprising:
after receiving File I/O requests, checking, by a processor, that the database session ID encoded in the filename matches an active session ID.

10. The method of claim 1, where in a system process ID is used to generate the filename;
and further comprising:
after receiving File I/O requests, checking, by a processor, that the system process ID encoded in the filename matches an active client system process ID or group ID.

11. An apparatus comprising:
a database;
a processor configured to:
execute a client process which enrolls access to a data object in the database by:
a) retrieving from the database a set of data describing a data object;
b) generating a filename using the retrieved data and a file extension supplied by the client application;
c) correlating the filename with the data object;
execute a user process which forwards File I/O Requests, that perform File I/O actions on a file in a file system, to a virtual file system API and virtual file system module;
translate, by the virtual file system API, the received File I/O requests into Data Operations, that perform equivalent File I/O actions on data in a database;
execute, by the virtual file system module, the Data Operations on the data object in the database, correlated with the filename.

12. The apparatus of claim 11 wherein the client process further enrolls access to a data object in the database by:
   after correlating the filename with the data object, restricting use of the filename to access the data object after a specific date.

13. The apparatus of claim 11 wherein the client process further enrolls access to a data object in the database by:
   after correlating the filename with the data object, restricting use of the filename to access the data object after the data object has been accessed a specific number of times.

14. The apparatus of claim 11, wherein the generated filename includes a subdirectory specification.

15. The apparatus of claim 11, wherein the filename is generated from user supplied text.

16. The apparatus of claim 11, wherein the filename is randomly generated.

17. The apparatus of claim 11, wherein the filename is a combination of user supplied text and randomly generated characters.

18. The apparatus of claim 11 where in a database session ID is used to generate the filename;
   and the user process further checks that the database session ID encoded in the filename matches an active session ID.

19. The apparatus of claim 11, where in a system process ID is used to generate the filename;
   and the user process further checks that the system process ID encoded in the filename matches an active client system process ID or group ID.

* * * * *